US012514246B2

(12) United States Patent
Scribner

(10) Patent No.: US 12,514,246 B2
(45) Date of Patent: Jan. 6, 2026

(54) FLOATING DECOY BASE

(71) Applicant: Christopher Scribner, Sullivan, IL (US)

(72) Inventor: Christopher Scribner, Sullivan, IL (US)

(*) Notice: Subject to any disclaimer, the term of this patent is extended or adjusted under 35 U.S.C. 154(b) by 0 days.

(21) Appl. No.: 18/824,407

(22) Filed: Sep. 4, 2024

(65) Prior Publication Data
US 2025/0072414 A1 Mar. 6, 2025

Related U.S. Application Data

(60) Provisional application No. 63/536,776, filed on Sep. 6, 2023.

(51) Int. Cl.
A01M 31/06 (2006.01)
(52) U.S. Cl.
CPC .................. A01M 31/06 (2013.01)
(58) Field of Classification Search
CPC ................................... A01M 31/06
USPC .............................................. 43/3
See application file for complete search history.

(56) References Cited

U.S. PATENT DOCUMENTS

| | | | | |
|---|---|---|---|---|
| 1,571,711 A | * | 2/1926 | Dewey | A01M 31/06 43/3 |
| 5,832,650 A | * | 11/1998 | Franceschini | A01M 31/06 43/3 |
| 7,337,568 B2 | | 3/2008 | Johnson | |
| D865,904 S | * | 11/2019 | Norton | D22/125 |
| 10,986,833 B2 | * | 4/2021 | Norton | A01M 31/06 |
| 11,497,205 B1 | * | 11/2022 | Adams | A01M 31/06 |
| 2003/0061755 A1 | * | 4/2003 | McGhghy | A01M 31/06 43/3 |
| 2009/0126253 A1 | | 5/2009 | Wood et al. | |
| 2018/0000064 A1 | | 1/2018 | Roessler | |
| 2019/0364880 A1 | * | 12/2019 | Norton | A01M 31/06 |

FOREIGN PATENT DOCUMENTS

CA 2275780 A1 12/2000

OTHER PUBLICATIONS

"Dive Bomb Goose Silhouettes into FLOATERS !? ", Average Opportunity, [YouTube video], YouTube, Retrieved Jun. 15, 2024, from https://www.youtube.com/watch?v=0Z6Y0TGMQU0.

(Continued)

Primary Examiner — Christopher D Hutchens
(74) Attorney, Agent, or Firm — Foley & Lardner LLP

(57) ABSTRACT

A floating decoy base for a land decoy includes a buoyant first float member, a buoyant second float member, and a coupling member. The first float member and the second float member each include a cooperating wall, a keel coupled to the cooperating wall, and a mounting feature. The coupling member is engaged with the first float member and second float member to selectively couple the first float member to the second float member with the cooperating wall of the first float member adjacent the cooperating wall of the second float member. At least one mounting feature of the first and second float members is configured to engage with at least a portion of a land decoy to couple a land decoy to the floating decoy base.

20 Claims, 26 Drawing Sheets

(56) References Cited

OTHER PUBLICATIONS

"How to Make Floating Goose Decoys out of Shells", The Backwoodsman's Institute, [YouTube video], YouTube, Retrieved Jun. 15, 2024, from https://www.youtube.com/watch?v=-aRIZhSFYFg.
"V Boards for Silhouette Decoys", Hooked on Quack, [YouTube video], YouTube, Retrieved Jun. 15, 2024, from https://www.youtube.com/watch?v=0rd73M2NvQI.

\* cited by examiner

FLOATING DECOY BASE

CROSS-REFERENCE TO RELATED PATENT APPLICATIONS

This application claims the benefit of and priority to U.S. Provisional Application No. 63/536,776, filed on Sep. 6, 2023, the entire disclosure of which is hereby incorporated by reference herein.

BACKGROUND

The present disclosure relates generally to hunting decoys. Hunters use decoys that resemble an animal to imitate or simulate the presence of the animal in an area, which can attract live animals to the area and allow the hunter to capture or kill the animal. For individuals hunting animals that occupy between land- and water-based environments (e.g., water fowl, ducks, pheasants, or other animals), it is necessary to own decoys structured for use in land-based environments and separate decoys structured for water-based environments. Consequently, individuals need to own two separate sets of decoys, which is costly and requires a large volume of storage space to store the two separate sets of decoys.

SUMMARY

At least one embodiment relates to a floating decoy base for a land decoy. The floating decoy base for a land decoy includes a buoyant first float member, a buoyant second float member, and a coupling member. The buoyant first float member includes a cooperating wall, a keel coupled to the cooperating wall, and a mounting feature. The buoyant second float member includes a cooperating wall, a keel coupled to the cooperating wall, and a mounting feature. The coupling member is engaged with the first float member and second float member to selectively couple the first float member to the second float member with the cooperating wall of the first float member adjacent the cooperating wall of the second float member. With the floating decoy base positioned in a body of water, the mounting feature of the first float member and the mounting feature of the second float member are positioned at least partially above a surface of the body of water, and the keel of the first float member and the keel of the second float member are positioned below the surface of the body of water. At least one mounting feature of the first and second float members is configured to engage with at least a portion of a land decoy to couple a land decoy to the floating decoy base.

Another embodiment relates to a floating decoy base for a land decoy. The floating decoy base includes a buoyant first float member, a buoyant second float member, and a coupling member. The first float member includes a first portion coupled with a second portion, the first portion defining a first wall and a cooperating wall substantially perpendicular to the first wall, the second portion including a waist coupled to the cooperating wall. The second float member includes a first portion coupled with a second portion, the first portion defining a first wall and a cooperating wall substantially perpendicular to the first wall, the second portion including a waist coupled to the cooperating wall. The coupling member is positioned at least partially around the waist of the first float member and the waist of the second float member to selectively couple the first float member to the second float member with the cooperating wall of the first float member adjacent to the cooperating wall of the second float member. With the floating decoy base positioned in a body of water, the first portion of the first float member and the first portion of the second float member are positioned at least partially above a surface of the body of water, and second portion of first float member and the second portion of the second float member are positioned below the surface of the body of water. The coupling member is configured to apply a compressive force to a portion of a land decoy positioned between the cooperating wall of the first float member and the cooperating wall of the second float member to couple a land decoy to the first float member and the second float member.

Another embodiment relates to a floating decoy base. The floating decoy base includes a bottom wall configured to contact a surface of a body of water with the floating decoy base in an operating position. The floating decoy base includes an outer wall coupled with the bottom wall, the outer wall defining an opening and a slot and configured to be positioned above the surface of the water in the operating position. The floating decoy base includes a keel coupled with the bottom wall and configured to be positioned beneath the surface of the body of water in the operating position. The floating decoy base includes at least one loop coupled with the keel. The opening is configured to receive a rod of a first land decoy to selectively couple a first land decoy with the outer wall. The slot is configured to receive a portion of a second land decoy to selectively couple a second land decoy with the outer wall.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
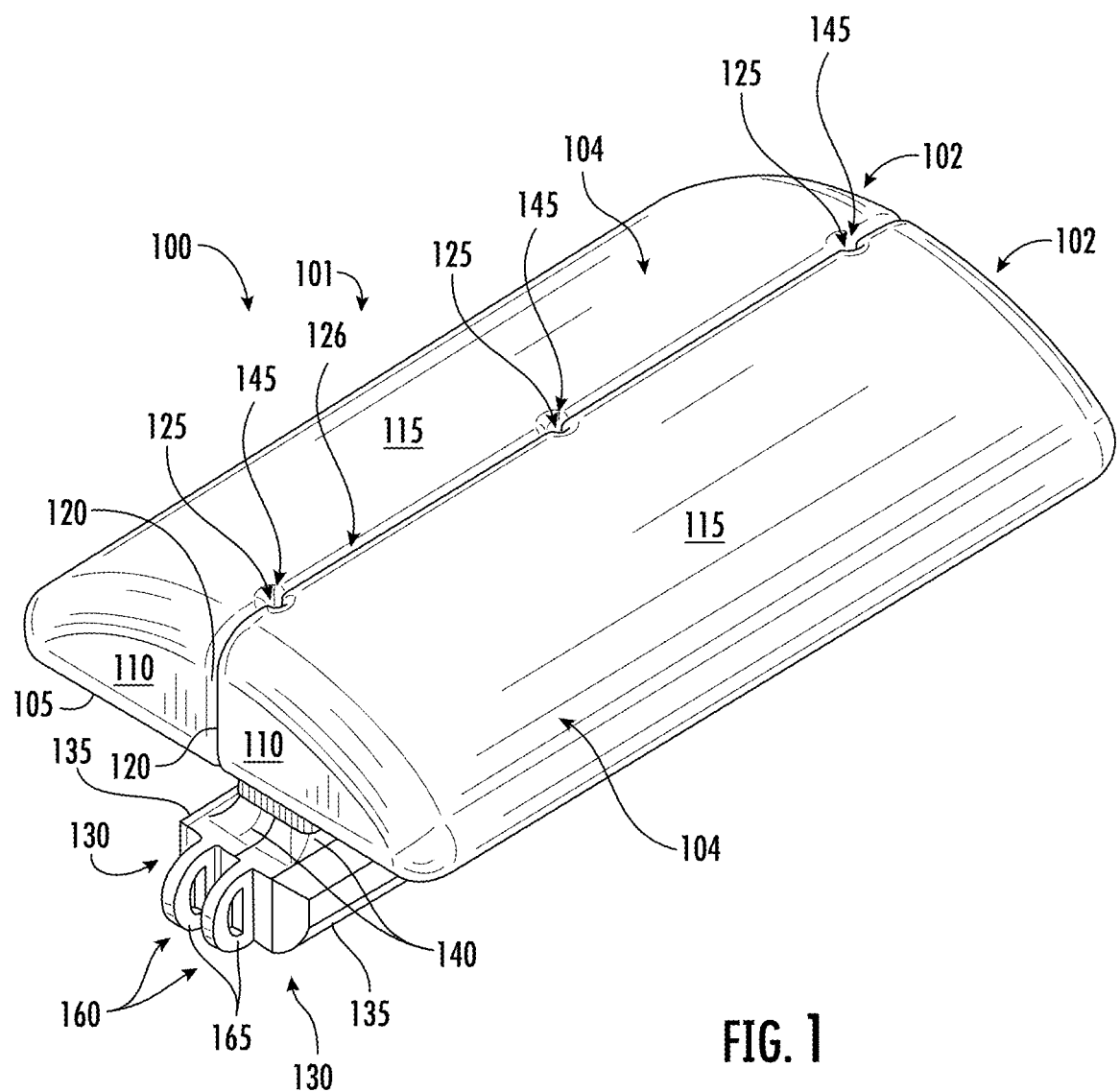
FIG. 1 is a perspective of a floating decoy base for a land decoy, according to an embodiment.
Figure 2:
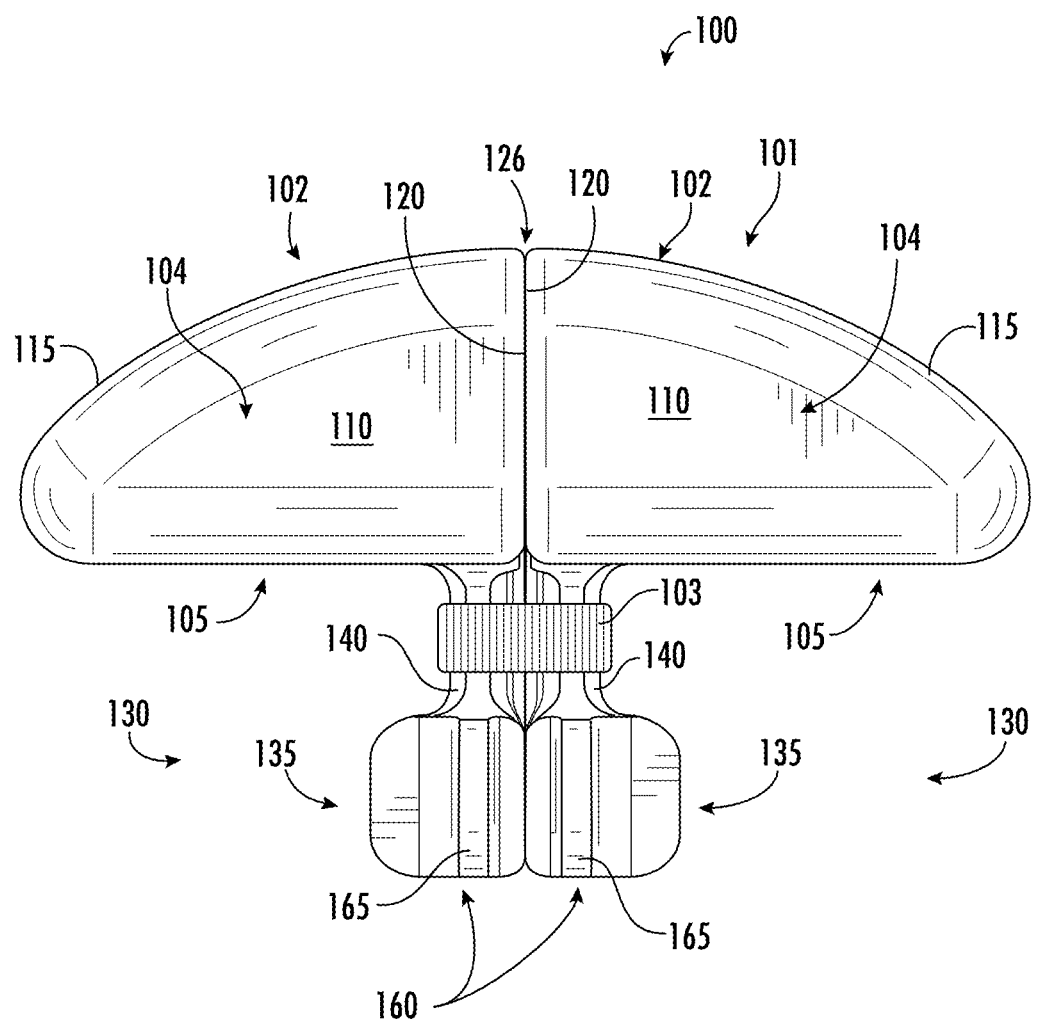
FIG. 2 is side view of the floating decoy base of FIG. 1, according to an embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a floating base for a decoy, such as a duck decoy, a pheasant decoy, or some other decoy, is shown according to various embodiments. The floating base is configured to float on a body of water or some other substance (e.g., a lake, a pond, a river, etc.) in an operating position, where at least a portion of the decoy base is positioned above a water surface and at least a portion positioned beneath the water surface. The decoy base includes one or more mounting features, such a slots, at least one opening, or other features that are configured to facilitate the selective coupling of one or more decoys to the decoy base. Advantageously, the decoy base includes multiple mounting features that facilitate the selective coupling of decoys of varying type or style (e.g., silhouette decoy, shell decoy, sock decoy, or some other type of decoy) to the floating base, where the decoys can be decoys configured for use on land. For example, the floating base can convert land decoys (e.g., decoys configured for use on land) into floating decoys so that a hunter can use a land decoy on water. Because the floating base is configured to float atop a water surface, a decoy (e.g., a land decoy) that is coupled to the decoy base can float atop the water surface.

Some of the technical solutions provided herein include the ability to couple land decoys to the floating decoy base that the user can use the land decoys on a body of water rather than purchasing separate floating decoys intended solely for use on land. The ability to utilize a land decoy on a body of water eliminates the need for a user (e.g., a hunter) to own and maintain a set of decoys for land and a set of decoys for water. Rather, the user need only possess a land decoy and the floating decoy base to hunt both in land-based and water-based environments. By decreasing an amount of decoys needed to hunt, the user can save money and decreasing the storage space needed to store decoys (e.g., water fowl decoy, duck decoy, or some other decoy).

FIGS. 1-6, among others, depict a floating decoy base 100 according to an exemplary embodiment. The decoy base 100 (e.g., floating base assembly 100, base 100, base assembly 100) comprises a body 101, a coupling member 103, and an anchor 300, according to an exemplary embodiment. The body 101 includes a first float member 102 (e.g., a buoyant first float member 102) and a second float member 102 (e.g., a buoyant second float member 102), where the first float member 102 and the second float member 102 collectively define the body 101 when coupled or otherwise joined. For example, the second wall 120 (e.g., the cooperating wall 120) of first float member 102 is positioned adjacent (e.g., directly or indirectly adjacent) to the second wall 120 (e.g., the cooperating wall 120) of the second float member 102 via the coupling member 103 to couple the first float member 102 with the second float member 102 to form the body 101. The anchor 300 is detachably coupled with the body 101. The decoy base 100 includes at least one mounting feature configured to facilitate the coupling of a decoy (e.g., a water fowl decoy, a duck decoy, a pheasant decoy, or some other decoy) to the decoy base 100. According to an exemplary embodiment, the decoy base 100 includes first mounting feature, shown as an opening 145, and a second mounting feature, shown as a slot 126, as is discussed in detail below. During operation, the decoy base 100 is placed in a body of water (e.g., a lake, a river, a pond, a stream, a marsh, or some other body of water or other liquid) when in an operating position, and is used to support a decoy, such as a silhouette decoy, a shell decoy, a sock decoy, or some other decoy. For example, a first decoy type (e.g., a sock decoy or a shell decoy) can be coupled with the decoy base 100 via the first mounting feature (e.g., the opening 145) of the decoy base 100. A second decoy type (e.g., a silhouette decoy) can be coupled with the decoy base 100 via the second mounting feature (e.g., the slot 126). In general, the decoy base 100 couples with the decoy to support the decoy at least partially above the surface of the water to simulate the presence on the body of water of the animal or creature depicted by the decoy. According to an exemplary embodiment and as discussed in greater detail below, the decoy can be a decoy that, when coupled with the decoy base 100 can simulate the presence of a water fowl, duck, or pheasant on the body of water, which can further attract live (e.g., non-decoy) animals (e.g., water fowl, duck, pheasant, or some other animal) to the same body of water, whereupon a under can engage in his or her sport.

As shown in FIGS. 1-13, among others, the first float member 102 and the second float member 102 include a first portion 104 (e.g., an upper portion 104), a second portion 130, and a waist 140. The first portion 104 is coupled to the second portion 130 via the waist 140 (e.g., a waist 140). The first portion 104 is an upper portion, while the second portion 130 is a lower portion positioned vertically beneath the first portion 104 during operation of the decoy base 100, as described in greater detail below. The waist 140 can be at least partially positioned vertically between the first portion 104 and the second portion 130. According to an exemplary embodiment, the first portion 104 is a float portion configured to be positioned above a water surface with the decoy base 100 positioned in an operating position (e.g., positioned in a body of water), and the second portion 130 is a keel portion configured to be positioned beneath a water surface when the decoy base 100 is in an operating position positioned within a body of water. One or more of the first float member 102 or the second float member 102 include at least one anchor coupling portion 160 that is configured to couple with the anchor 300. When the decoy base 100 is placed in a body of water (e.g., during use of said decoy base 100), the first portion 104 is generally positioned above a water surface and the second portion 130 is generally positioned beneath the water surface.

The first portion 104 includes a first wall 105 (e.g., a bottom wall 105, first side 105, first face 105, first surface 105), a second wall 120 (e.g., a cooperating wall 120), a third wall 115, and a fourth wall 110. In some embodiments, the second wall 120 is common (e.g., is shared) with the second portion 130 such that the second wall 120 extends from the from the first portion 104 to the second portion 130. The first wall 105 is a substantially (e.g., ±15°) horizontal wall. For example, the first wall 105 is a bottom wall 105. The fourth wall 110 and the second wall 120 are substantially (e.g., ±15°) vertical walls. For example, the second wall 120 can be substantially perpendicular (e.g., ±15° from perpendicular) to the first wall 105. The fourth wall 110 can be a side wall, which is further oriented substantially perpendicular (e.g., ±15°) to the first wall 105 and the second wall 120. The first portion 104 can include two fourth walls 110 on opposing sides of the first portion 104. The third wall 115 is coupled with (e.g., connected to, integrally formed with) the first wall 105, the second wall 120, and the one or more fourth walls 110. For example, the third wall 115 can be a curved outer wall extending from an outermost side (e.g., end, edge, or portion) of the first wall 105 to an upper side (e.g., end, edge, or portion) of the second wall 120, as depicted in FIGS. 1, 2, and 4-10, among others. In other examples, the third wall 115 can be a substantially flat wall, a textured wall, or some other wall.

Figure 11:
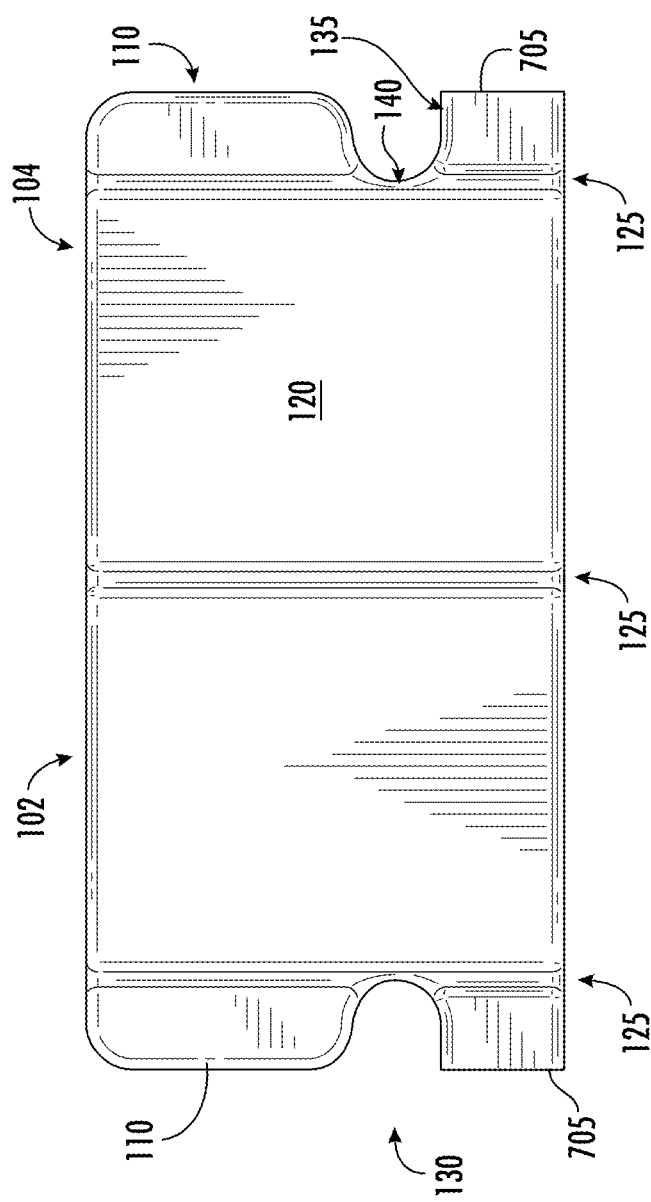
FIG. 11 is a rear view of the float member of FIG. 7, according to an embodiment.
Figure 12:
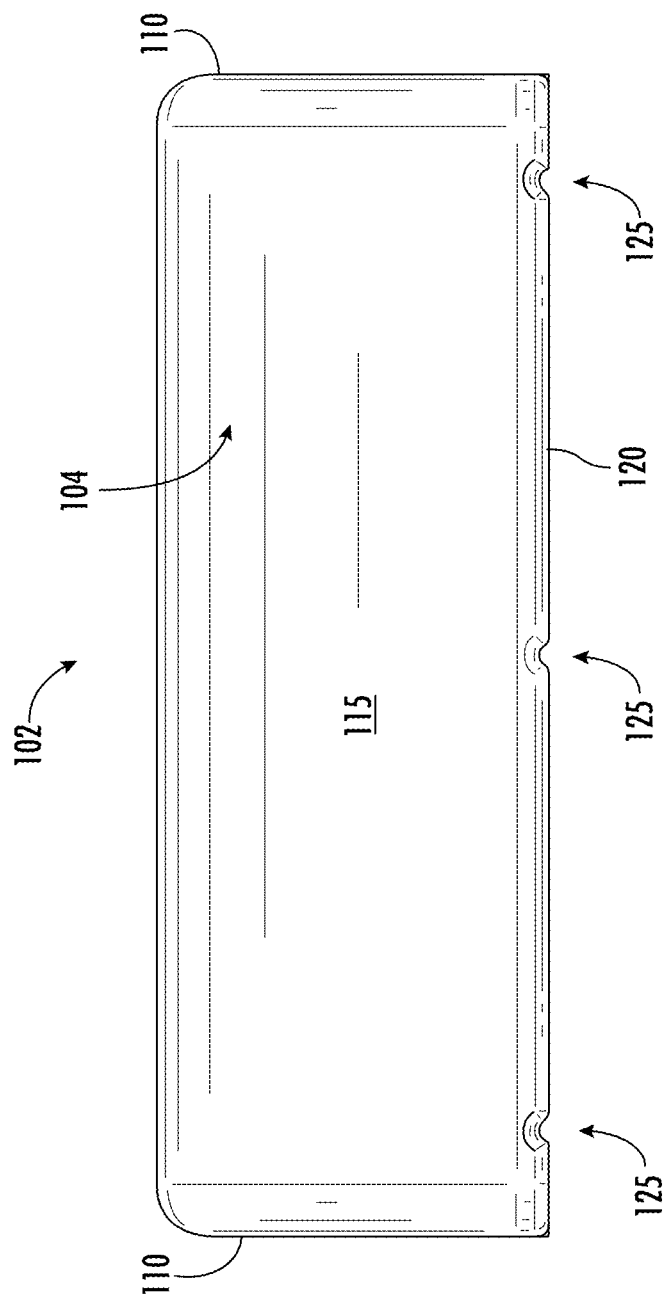
FIG. 12 is a top view of the float member of FIG. 7, according to an embodiment.
Figure 13:
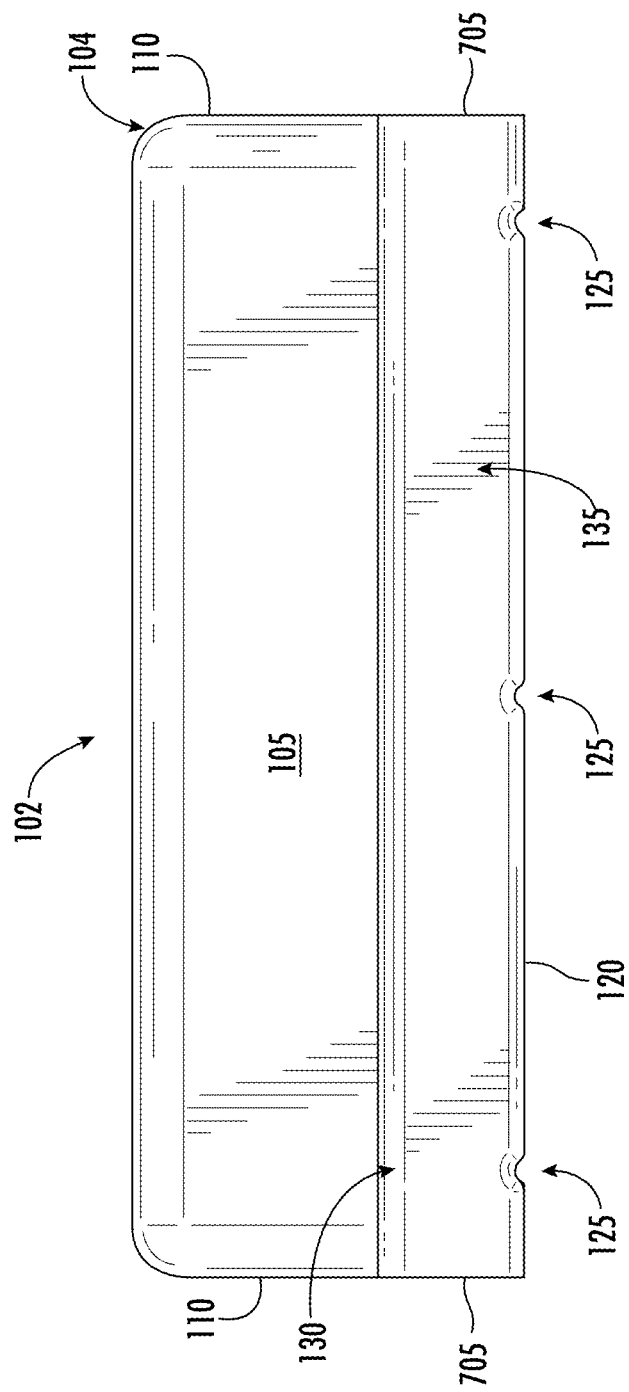
FIG. 13 is a bottom view of the float member of FIG. 7, according to an embodiment.
Figure 14:
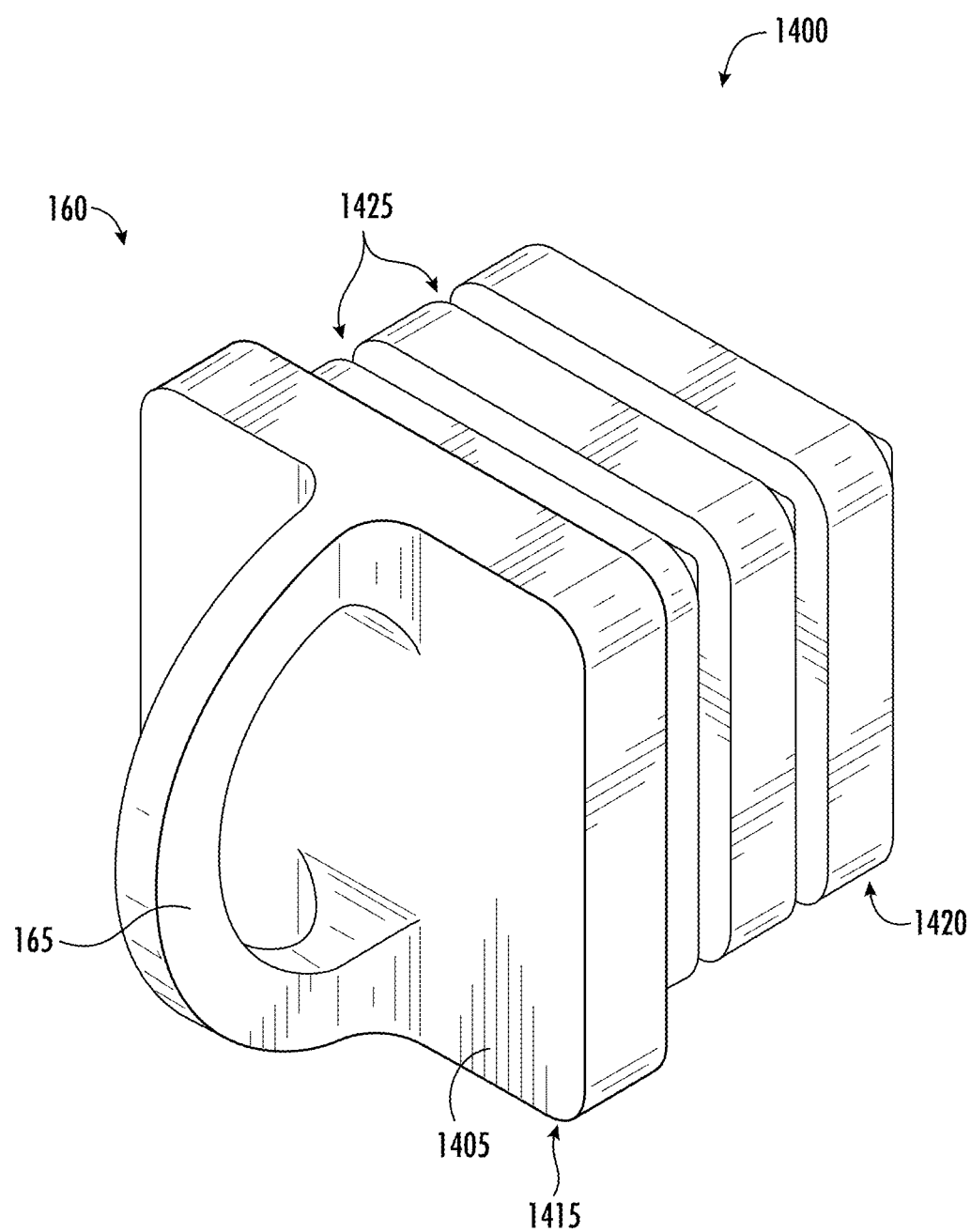
FIG. 14 is a top, front, right perspective view of a plug for a floating decoy base, according to an embodiment.
Figure 15:
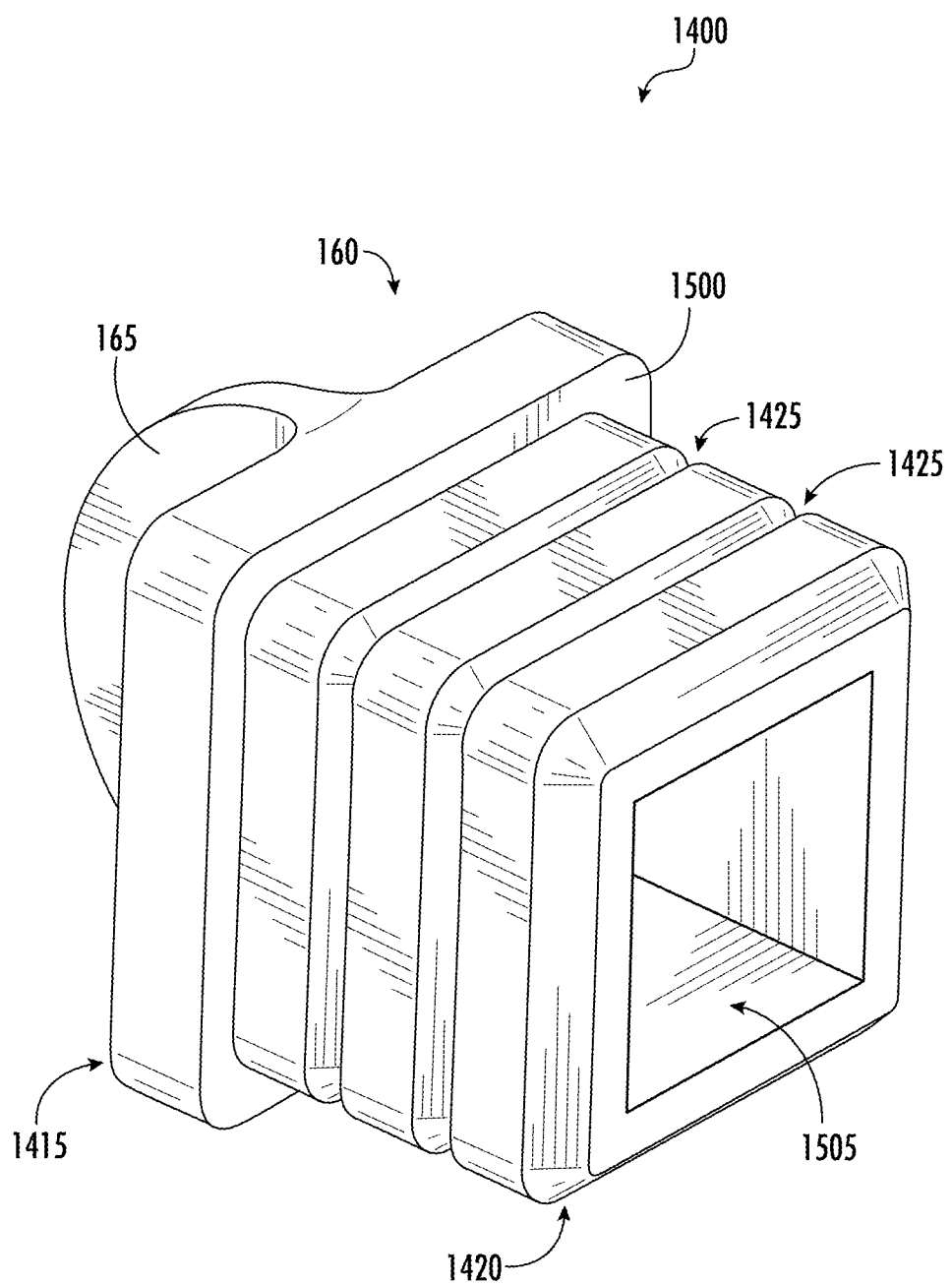
FIG. 15 is a top, rear, right perspective view of the plug of FIG. 14, according to an embodiment.
Figure 16:
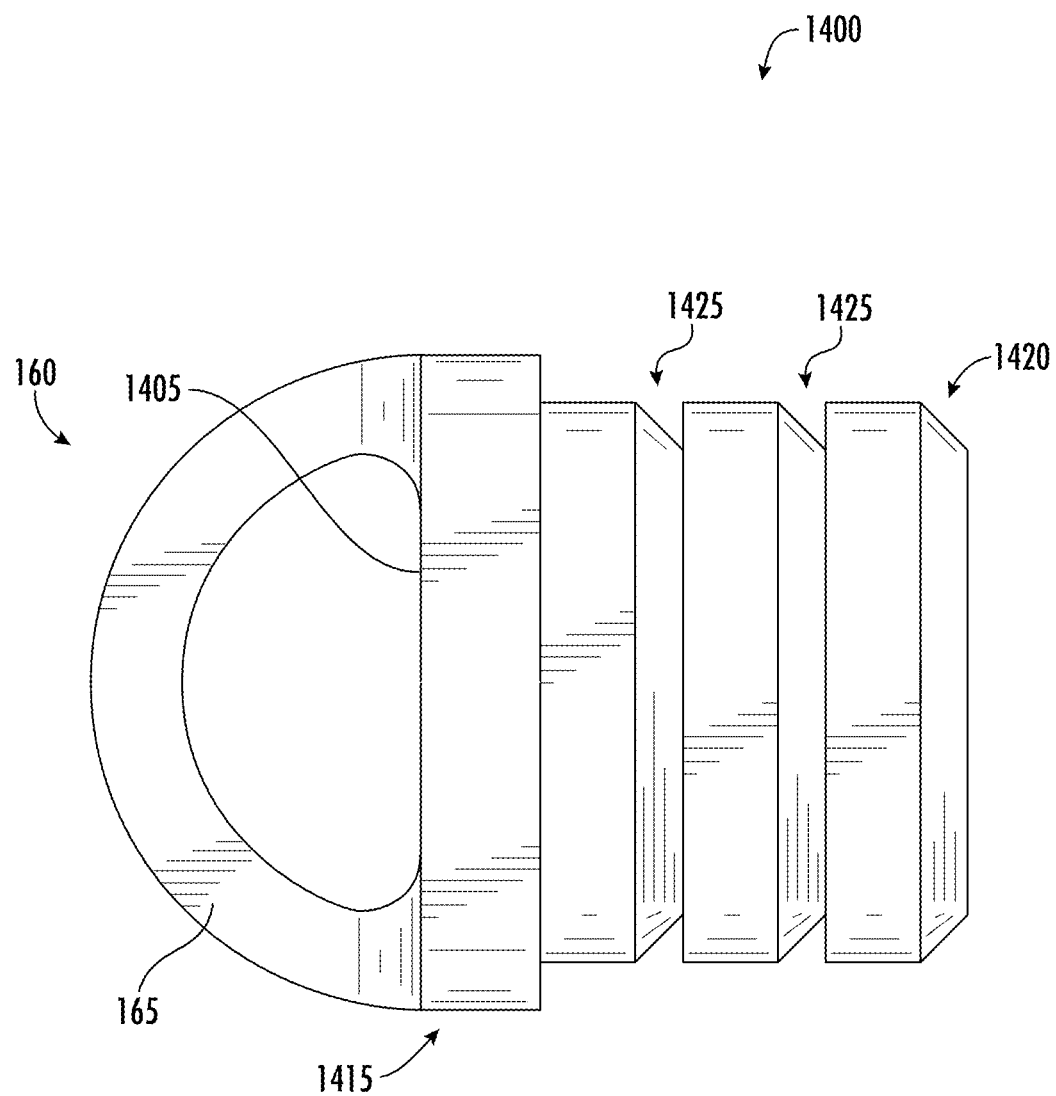
FIG. 16 is a right side view of the plug of FIG. 14, according to an embodiment.
Figure 17:
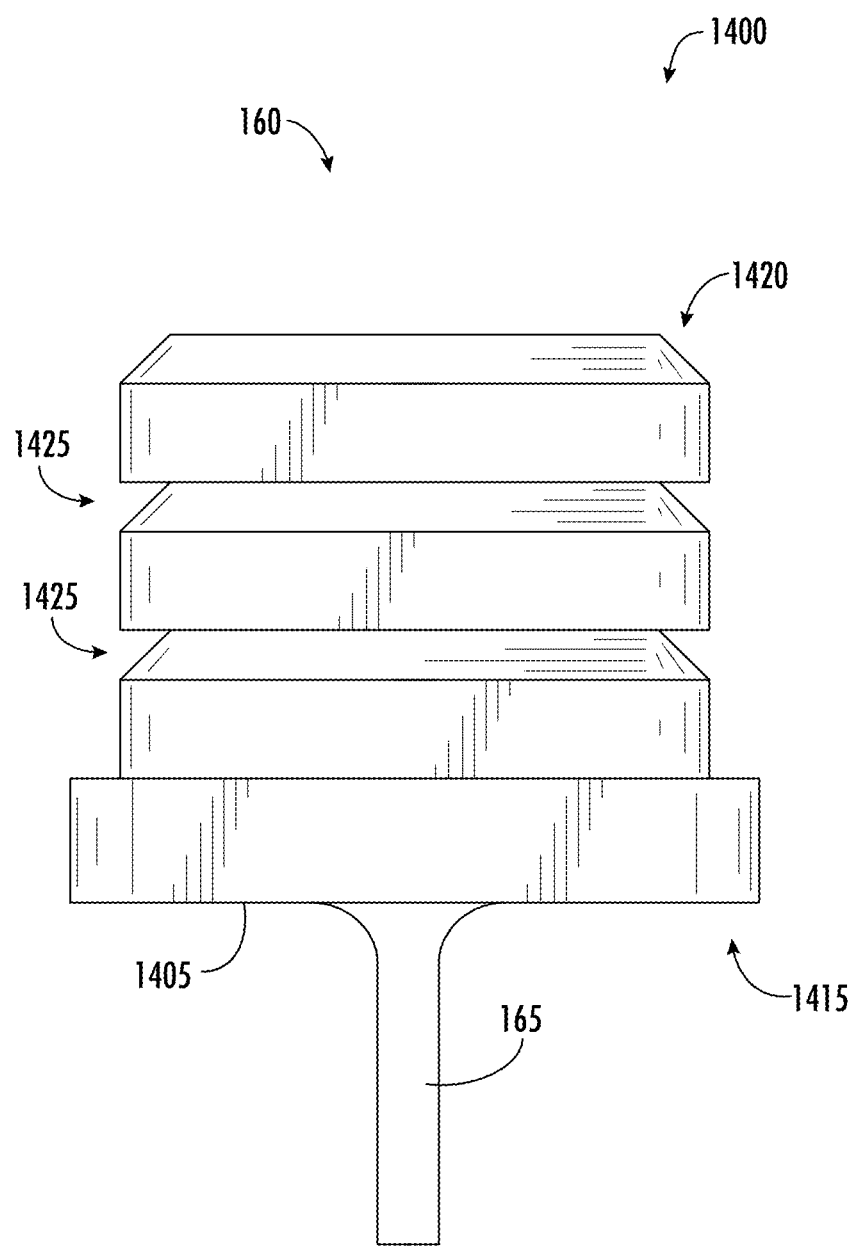
FIG. 17 is a top view of the plug of FIG. 14, according to an embodiment.
Figure 18:
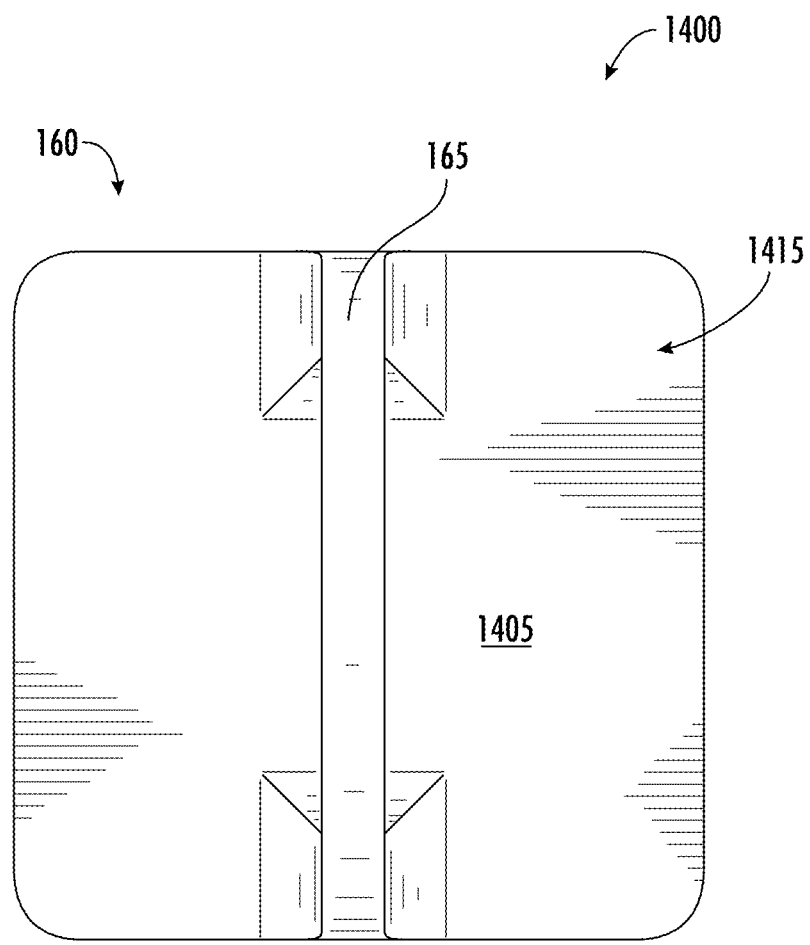
FIG. 18 is a front view of the plug of FIG. 14, according to an embodiment.
Figure 19:
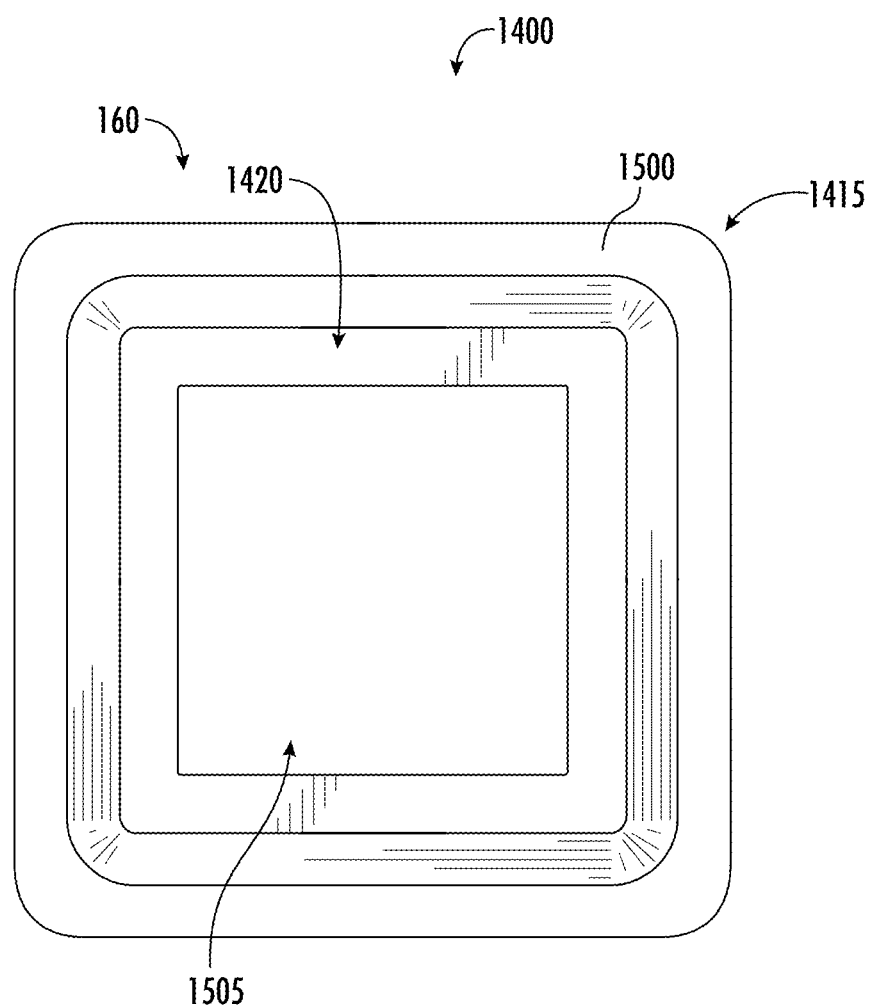
FIG. 19 is a rear view of the plug of FIG. 14, according to an embodiment.

According to an exemplary embodiment, the second wall 120 (e.g., the cooperating wall 120) defines one or more mounting features configured to receive or facilitate the coupling of a decoy (e.g., a water fowl decoy, a duck decoy, a pheasant decoy, or some other decoy) to the decoy base 100. For example, as shown in FIGS. 11-13, among others, float member 102 includes at least one mounting feature 125, shown as groove 125. The mounting feature can be a groove, like the embodiment shown, or other feature such as a hole, an opening, an aperture, a slot, or a notch that is configured to engage with a decoy or part thereof. As shown in FIGS. 7, 8, 11-13, among others, the groove 125 is positioned on or at the second wall 120 of the float member 102. Specifically, the groove 125 extends vertically along the second wall 120 of the float member 102. For example, the groove 125 has a substantially semicircular cross sectional shape within the second wall 120. When a first float member 102 is coupled with a second float member 102 to form the body 101 of the decoy base 100, at least one groove 125 of the first float member 102 is at least partially aligned with at least one groove 125 of the second float member 102 such that the corresponding grooves 125 collectively define the opening 145 of the decoy base 100. For example, the second wall 120 (e.g., the cooperating wall 120) of the first float member 102 and the second wall 120 (e.g., the cooperating wall 120) of the second float member 102 are positioned adjacent to each other and cooperate to align respective grooves 125 to form at least one opening 145. The opening 145 is a hole extending at least partially through the decoy base 100 that is configured to receive a rod or stake associated with a decoy. For example, a land decoy (e.g., a land-based decoy) can be staked into a ground surface when used on land. The decoy base 100 includes at least one opening 145 (e.g., an opening formed by multiple grooves 125 of float members 102) that are configured to receive or couple with the rod or stake of the land decoy. For example, the opening 145 can include a dimension (e.g., a diameter, a width, a depth) that corresponds to a typical land decoy. As is discussed in detail below, when a first float member 102 is coupled with a second float member 102 (e.g., via the coupling member 103), the opening 145 is positioned at the interface between the first float member 102 and the second float member 102. When the coupling member 103 applies a force to the first float member 102 and the second float member 102 to couple the two float members 102 together, the force is further exerted on to a rod or stake within the opening 145 to retain the rod or stake within the opening 145. For example, a radius or depth of the groove 125 can be smaller than a radius of a rod or stake, so that when two grooves 125 form the opening 145, the rod or stake is positioned against a wall of each grooves 125.

The second portion 130 includes a first section, shown as the waist 140, a second section 135, shown as a keel 135 (e.g., keel tube 135, keel portion 135), and at least one anchor coupling portion 160. According to an exemplary embodiment, the waist 140 and the keel 135 are coupled together. For example, the waist 140 and the keel 135 can be integrally molded together, such as by a blow molding, roto-molding, injection molding, or other polymeric molding operation. The second portion 130 can be coupled with the first portion 104. For example, the first portion 104 and the second portion 130 can be integrally molded, such as by a blow molding, roto-molding, injection molding, or other polymeric molding operation. In other examples, the first portion 104 is detachably coupled with the second portion 130 of the float member 102.

As shown in FIGS. 1-11, among others, the waist 140 extends vertically from the first wall 105 of the first portion 104 to the keel 135. As shown in FIGS. 1, 2, 5, and 6, among others, the waist 140 couples to the keel 135 to the first wall 105 such that the keel 135 is positioned vertically below the first wall 105. The second wall 120 (e.g., the cooperating wall 120) extends from the first portion 104 to the waist 140, and from the waist 140 to the keel 135 such that the second wall 120 forms substantially an entire side of the float member 102. As shown in the figures, the waist 140 includes at least one rounded or curved corner (e.g., a fillet) between the waist 140 and the first wall 105 and between the waist 140 and the keel 135. As depicted in FIGS. 7-13, among others, the keel 135 is a hollow tube that defines a cavity 700 and two opposing ends 705. The cavity 700 can extend through the keel 135 (e.g., from one end 705 to an opposite end 705). According to an exemplary embodiment, the keel 135 is an elongate tubular portion extending substantially along an axis. For example, the keel 135 includes a consistent cross-sectional shape along an entirety of a length of the keel 135. The keel 135 can include a square cross-sectional shape, a circular cross-sectional shape, a rectangular cross-sectional shape, or some other cross-sectional shape. For example, as depicted in FIGS. 1-13, among others, the keel 135 includes a square-like cross-sectional shape. In various embodiments, the coupling member 103 is a strap or belt that can be positioned around the waist 140, as is discussed below. In such embodiments, the coupling member 103 is retained vertically between the first portion 104 and the keel 135. For example, the coupling member 103 can be positioned vertically against an upper surface of the keel 135 and/or against the first wall 105 of the first portion 104, which can substantially prevent the coupling member 103 from slipping off the waist 140 in a vertical direction. The keel 135—and the second portion 130 more generally—acts to stabilize the decoy base 100 when the decoy base 100 is floating in body of water, such as by counteracting a wind force and preventing the decoy base 100 from undesirably tipping or capsizing in the water.

Figure 7:
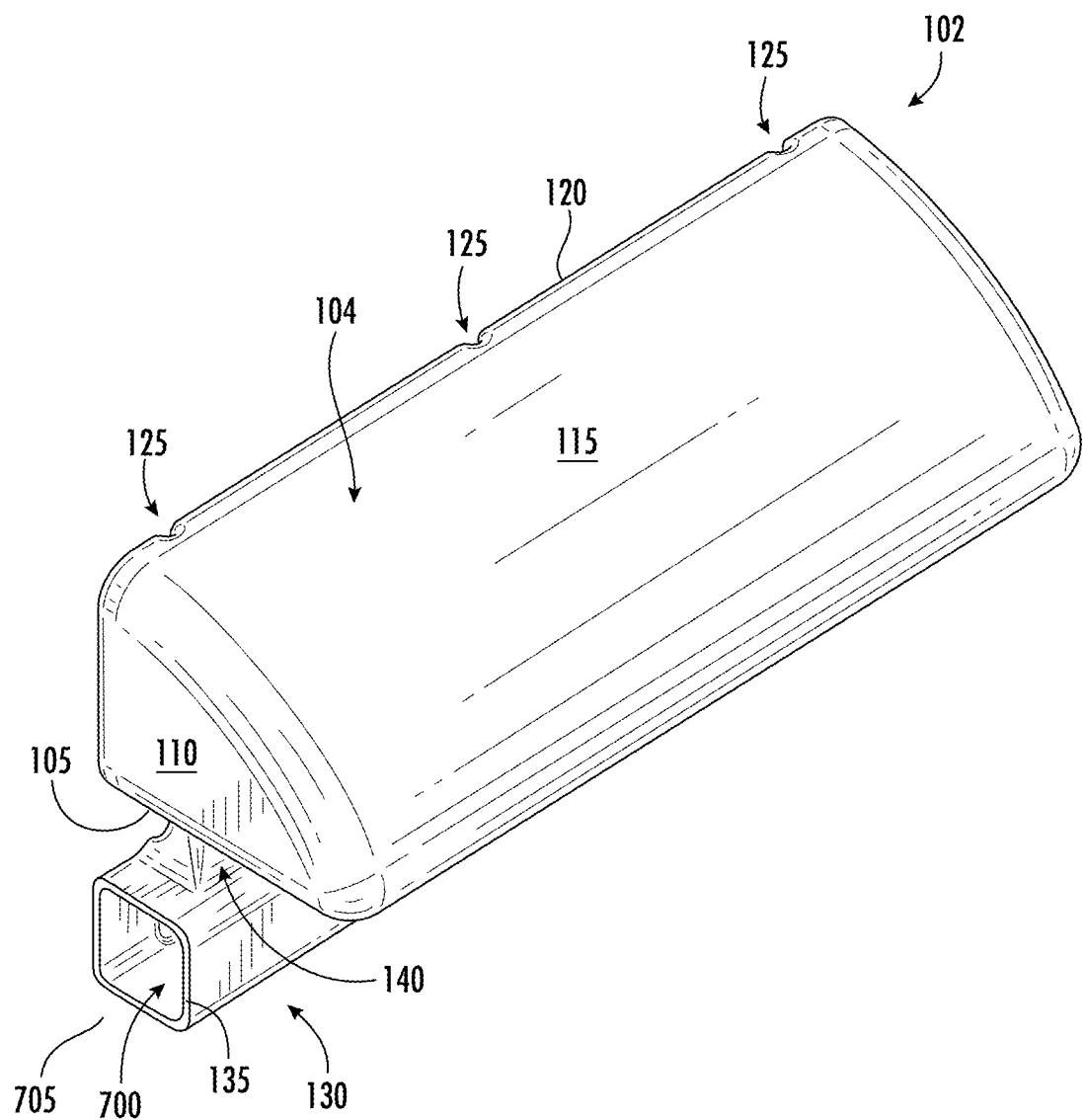
FIG. 7 is a perspective view of a float member of a floating decoy base, according to an embodiment.
Figure 8:
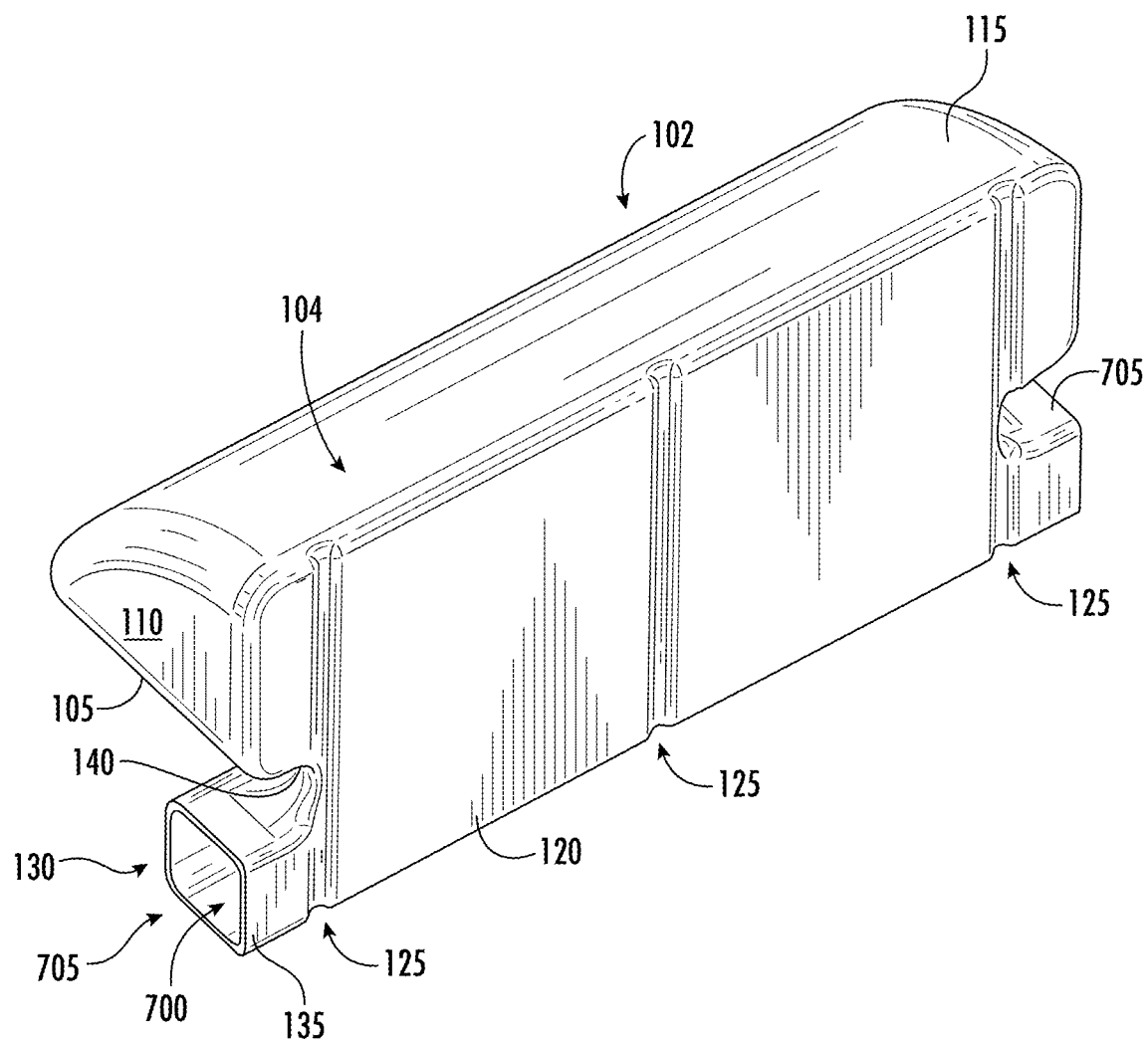
FIG. 8 is a perspective view of the float member of FIG. 7, according to an embodiment.
Figure 9:
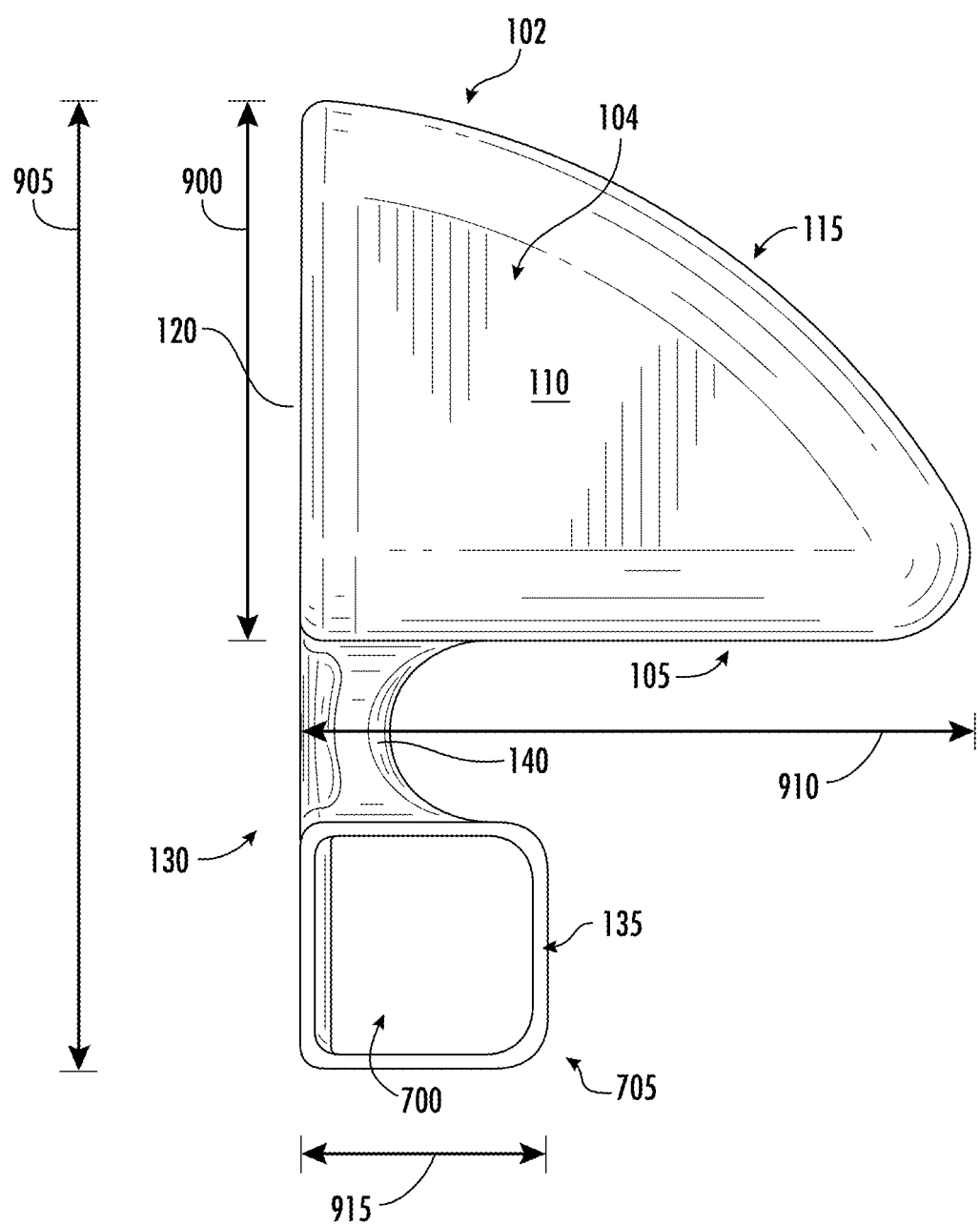
FIG. 9 is a side view of the float member of FIG. 7, according to an embodiment.

The keel 135 is composed of or contains some relatively heavy or weighted material such that the second portion 130 can be heavier than the first portion 104, for example. As shown in FIGS. 1-13, among others, the keel 135 is hollow. In such embodiments, the keel 135 is configured to house, hold, or contain some weighted material or media to provide the increased weight of the second portion 130. For example, as depicted in FIGS. 1-6, among others, the anchor coupling portion 160 of the second portion 130 can be integrally coupled with the keel 135 to encapsulate or retain any weighted material or object within the keel 135. In other embodiments, such as that depicted in FIGS. 7-13, the keel 135 can be hollow and accessible via removal of one or more anchor coupling portions 160. For example, the anchor coupling portion 160 can be a plug 1400 that is selectively removable from the keel 135 so that a user can access the cavity 700 of the keel 135. The plug 1400 can couple with an end 705 of the keel 135 to enclose the cavity 700 of the keel 135. In yet other embodiments, the keel 135 is not hollow, but instead is made from a substantially solid material (e.g., plastic, composite material, ceramic, metal, or some other material). In various embodiments, the increased weight of the second portion 130 relative to the first portion 104 can further bolster the stability of the decoy base 100 when floating in a body of water. FIGS. 7-9, among others, depict the float member 102 with a cavity 700 exposed. The keel cavity 700 is defined by the keel 135. The keel cavity 700 is a hollow space configured to at least partially enclose a weighted material, such as rock, stone, sand, cement, metal, or some other media to increase a weight of the keel 135, where increased weight of the keel 135 can bolster stability of the keel 135 and the decoy base 100 within a body of water. According to an exemplary embodiment, the plug 1400, as shown in FIGS. 14-19 and discussed in detail below, is configured to close both ends 705 of the keel 135 to enclose the cavity 700. For example, the plug 1400 can be coupled with each open end 705 of the keel 135 to enclose the cavity 700 within the keel 135 and between two plugs 1400.

The anchor coupling portion 160 of the keel 135 includes a loop, shown as loop 165. The loop 165 projects from an outer wall of the anchor coupling portion 160 of the keel 135. In embodiments where the anchor coupling portion 160 is or includes the plug 1400, the loop 165 may project from an outer face 1405 of the plug 1400. The loop 165 is configured to couple to the anchor 300. The second portion 130 may include a plurality of loops 165 so that the anchor 300 may be coupled to any one of the loops 165. For example, the second portion 130 can include a plurality of loops 165, including at least one loop 165 extending from each of a plurality of plugs 1400 and at least one loop 165 extending from the keel 135 itself. Coupling the anchor 300 in different locations allows the decoy base 100 to be positioned at different angles or positions, determined by the current flow of a water surface, while atop the water surface. Differing an orientation of one decoy base 100 relative to other decoy bases 100 can cause a group of decoy bases 100, each including at least one decoy, to be positioned in varying orientations so as to appear look more realistic and consequently attract more animals (e.g., water fowl, duck, pheasant, or some other animal).

Figure 10:
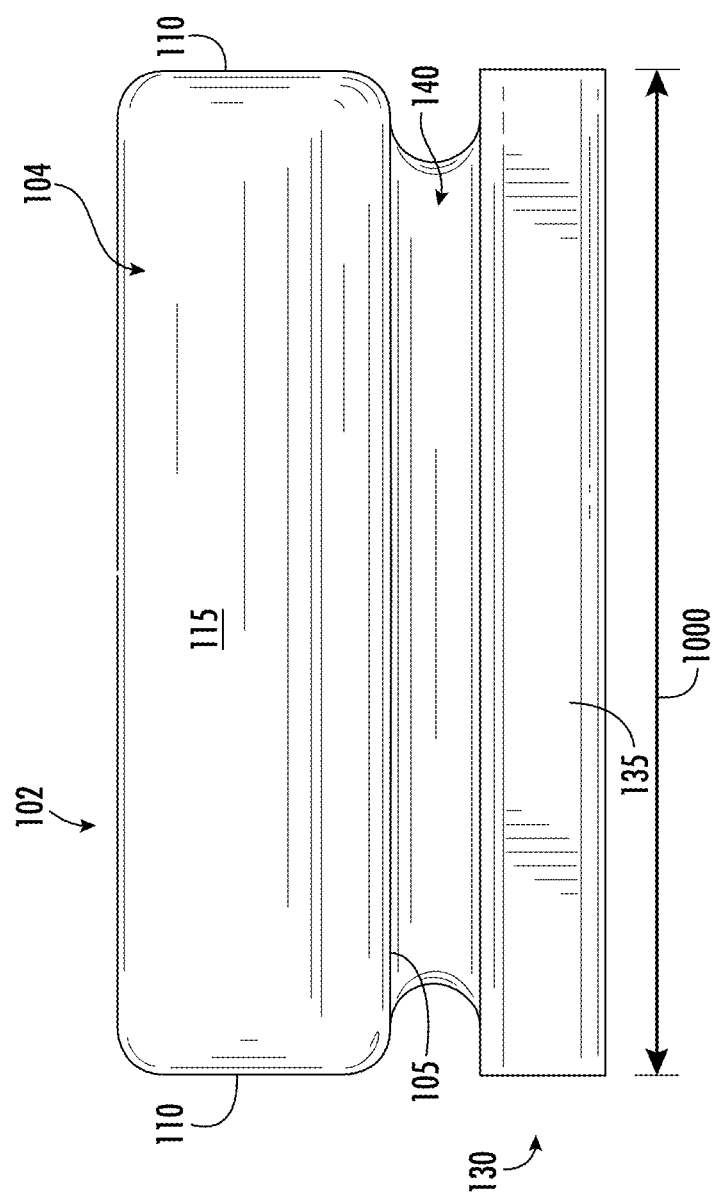
FIG. 10 is a front view of the float member of FIG. 7, according to an embodiment.

As shown in FIGS. 9 and 10, among others, the float member 102 includes an overall height 905, an overall width 910, and an overall length 1000. The first portion 104 of the float member 102 includes a height 900. According to an exemplary embodiment, the height 900 of the first portion 104 is defined by the distance between the first wall 105 and an edge or end of the third wall 115 where the third wall 115 meets the second wall 120 (e.g., the cooperating wall 120). In such embodiments, the height 900 of first portion 104 is greatest along the second wall 120; a height of the first portion 104 positioned distal relative to the second wall 120 can be lesser than the height 900. In other examples, some other region of the first portion 104 includes a height that is greater than the height 900 at the fourth wall. According to an exemplary embodiment, the height 900 can be relatively small so as to minimize an amount of the decoy base 100 that is visible above a water surface when the decoy base 100 is floating on said water surface. For example, the height 900 can be less than six inches, less than four inches, less than two inches, less than one inch, or some other height.

The first portion 104 further includes a width, shown as the overall width 910 of the float member 102. The width 910 is defined by the distance from the second wall 120 to an opposite edge or end of the first wall 105 (e.g., a distal-most end of the first portion 104). According to an exemplary embodiment, the first wall 105 establishes the overall width 910 of the float member 102. The first wall 105 includes the width 910, where the width 910 is selected to support the flotation of the decoy base 100 atop a water surface. For example, the first wall 105 can be a flat, partially flat, or partially horizontal surface that can at least partially rest on a water surface when the decoy base 100 is placed within a body of water, such as a lake, pond, river, or other body of water. The first wall 105 can support a buoyancy force imparted by the body of water, for example. The first wall 105 can be designed or adapted to support the weight of the decoy base 100 on the water surface so that the decoy base 100 floats on the water surface. For example, the first wall 105 includes a sufficiently large width 910 that is configured to support the weight of the decoy base 100 on the water surface without allowing the decoy base 100 to capsize or tip by an undesirable degree. According to an exemplary embodiment, the width 910 can be greater than the height 900. In other examples, the width 910 is less than ten inches, less than five inches, less than three inches, or some other dimension.

The overall height 905 of the float member 102 is the vertical distance from a bottom of the second portion 130 to a top of the first portion 104. For example, the overall height 905 is the linear distance along the second wall 120 from the bottom of the keel 135 to the top of the first portion 104 (e.g., an upper-most edge of the third wall 115). As shown in FIG. 10, the float member 102 includes an overall length 1000. The overall length 1000 is defined by the distance between opposing fourth walls 110, for example. According to an exemplary embodiment, the overall length 1000 can be greater than the overall height 905 or the overall width 910 of the float member 102.

As shown in FIG. 9, among others, the first portion 104 is a widest portion of the float member 102, while the waist 140 is a narrowest portion of the float member 102. For example, the keel 135 includes a keel tube width 915 and the waist includes a waist width. The waist width is less than the keel tube width 915, and the keel tube width 915 is less than the width of the first portion 104 (e.g., the overall width 910). According to an exemplary embodiment, the first portion 104 can be the tallest portion of the float member 102. In other embodiments, the first portion 104 is not the tallest portion. For example, the keel 135 or the waist 140 can be taller than the first portion 104 in some embodiments. In various embodiments, the first portion 104 can include the height 900 that is less than the collective height of the second portion 130 (e.g., the height of the waist 140 and the height of the keel 135) such that the second portion 130 extends farther beneath a water surface than the first portion extends above the water surface. Referring now to FIG. 10, the waist 140 is the shortest or narrowest portion of the float member 102. In some examples, the first portion 104 and the keel 135 include the same length (e.g., the overall length 1000). In other embodiments, the keel 135 and the first portion 104 have differing lengths.

The first portion 104 includes the first wall 105, the second wall 120, the third wall 115, and the fourth wall 110 integrally formed in a single structure. For example, the float member 102—including the first portion 104—can be molded via a blow molding, roto-molding, injection molding, or other polymeric molding operation such that the first wall 105, the second wall 120, the third wall 115, and the fourth wall 110 are integrally molded together. In other embodiments, the float member 102 is produced by some other operation so as to join the first wall 105, the second wall 120, the third wall 115, and the fourth wall 110 together.

Although the depicted embodiments include a first float member 102 coupled with a second float member 102 to collectively form the body 101, where the first float member 102 and second float member 102 are substantially identical, it is understood that the first float member 102 can differ from the second float member 102. For example, the first float member 102 can include a differing dimension (e.g., overall length, overall height, overall width), a differing cross-sectional shape, a differing material, or some other difference. In yet other examples, the body 101 of the decoy base 100 can be formed by coupling more than two float members 102 together, where the more than two float members 102 can be similarly or dissimilarly dimensioned, shaped, or constructed, for example. For example, the body 101 can be a single unitary body 101 rather than a body 101 formed by the coupling of the first float member 102 with the second float member 102.

Figure 3:
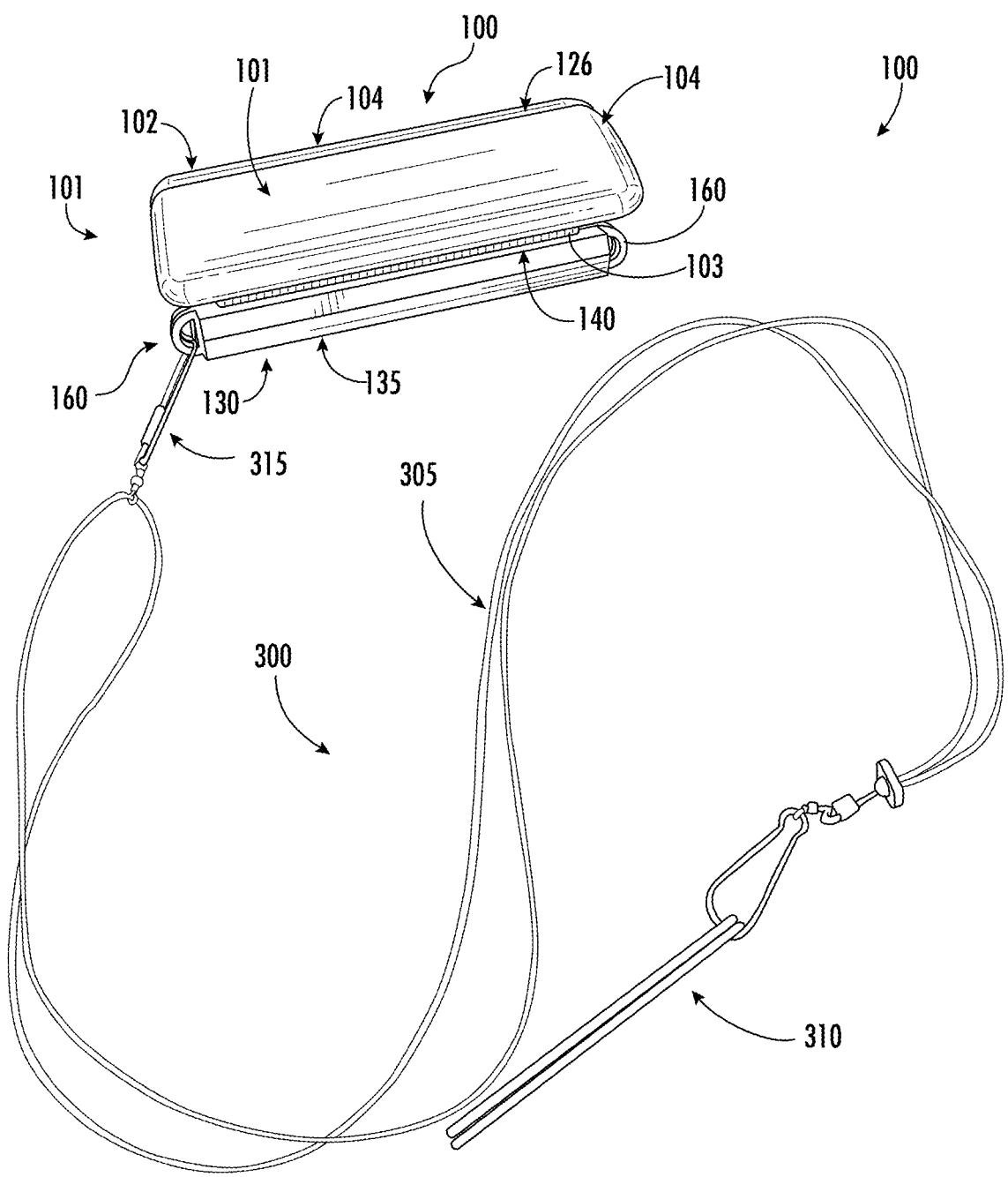
FIG. 3 is a perspective view of the floating decoy base of FIG. 1 with an anchor, according to an embodiment.
Figure 4:
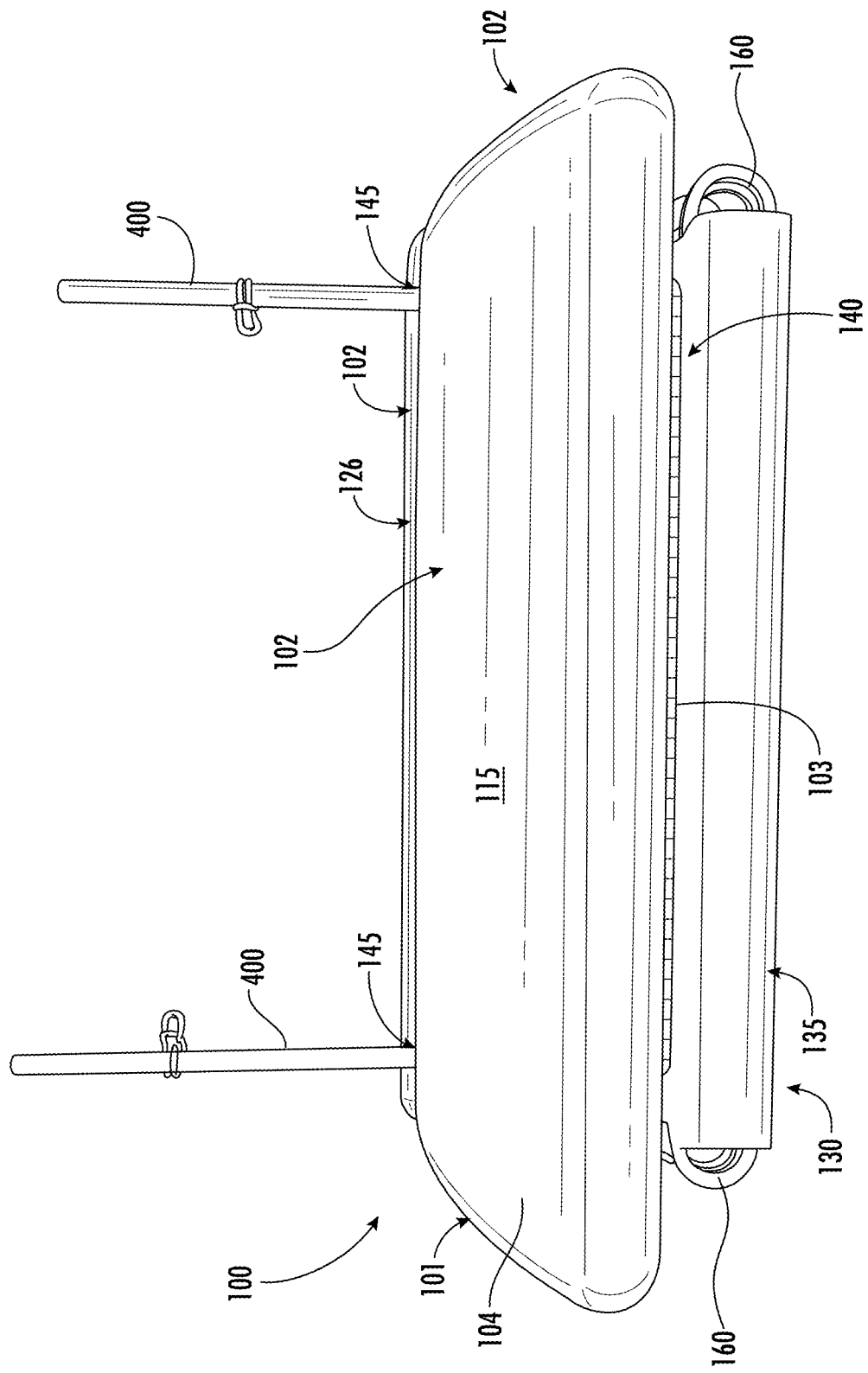
FIG. 4 is a side view of the floating decoy base of FIG. 1, according to an embodiment.
Figure 5:
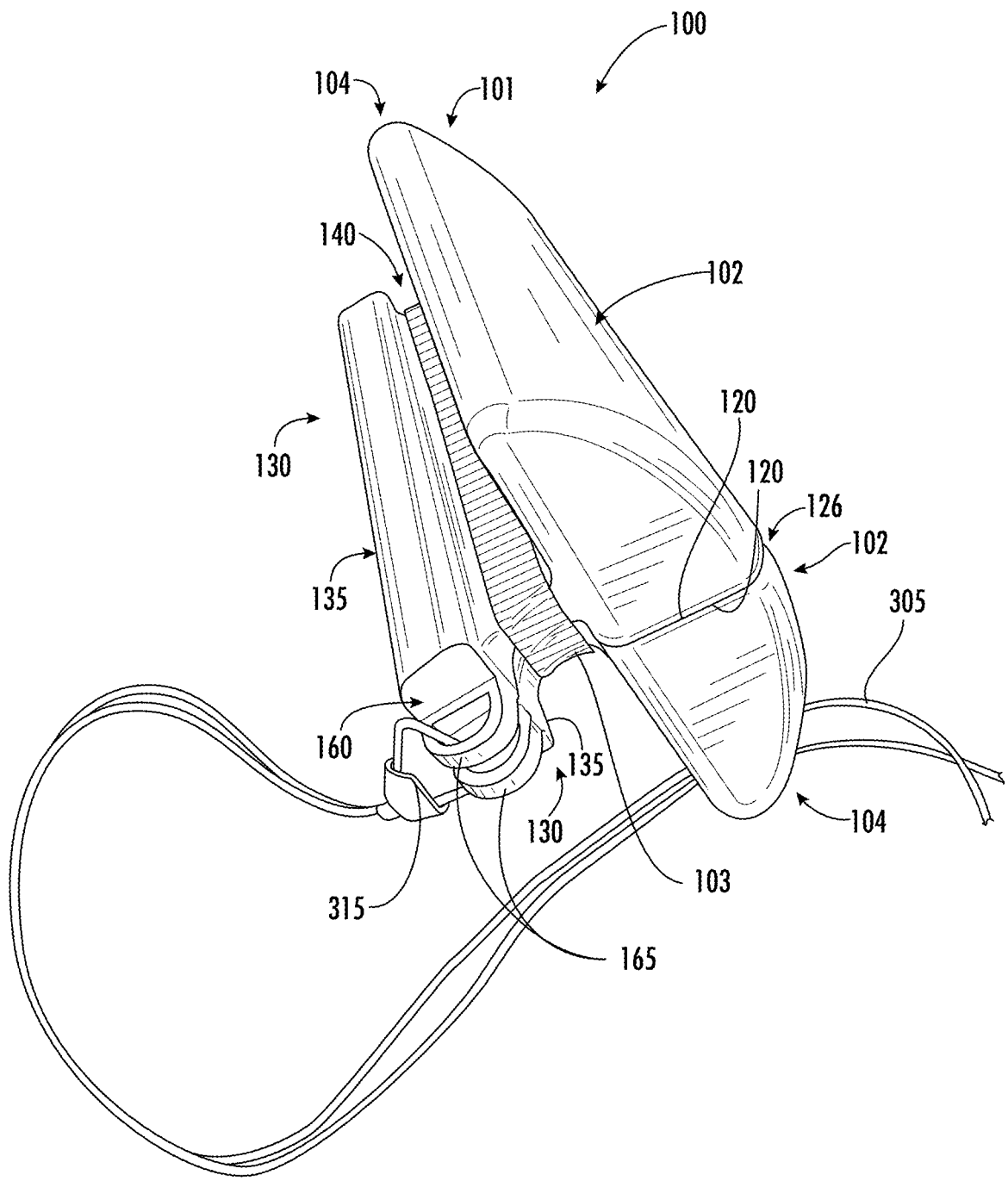
FIG. 5 is a perspective view of the floating decoy base of FIG. 1, according to an embodiment.
Figure 6:
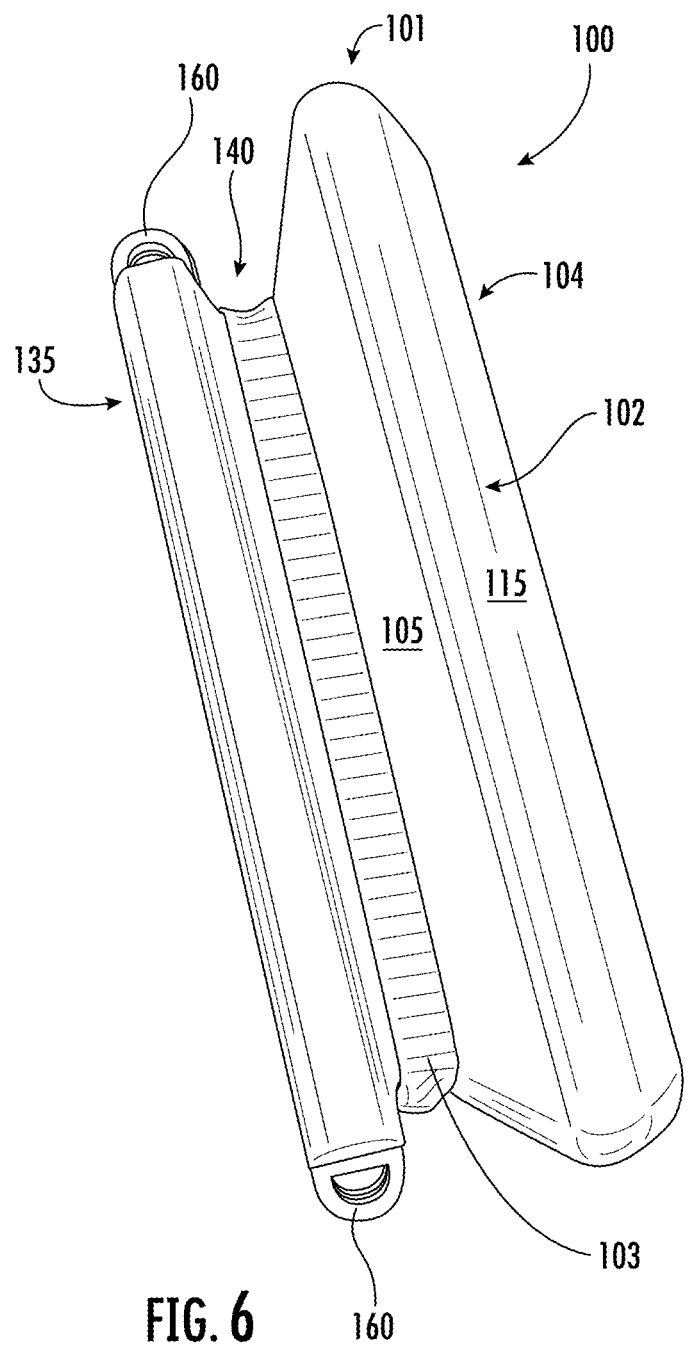
FIG. 6 is a perspective view of the floating decoy base of FIG. 1, according to an embodiment.

As shown in FIGS. 3, 5, and 6 the decoy base 100 includes an anchor assembly, shown as the anchor 300. The anchor 300 includes an anchor securement mechanism, shown as clip 315, a tether, shown as rope 305, and a weighted anchor shown as weighted anchor 310. The anchor 300 is coupled to the decoy base 100 by the clip 315. As shown in FIGS. 3, 5, and 6, among others, the clip 315 of the anchor 300 is detachably coupled to the loop 165 of the anchor coupling portion 160 of the second portion 130. The rope 305 is coupled to the clip 315 and to the weighted anchor 310. For example, the rope 305 includes a first end coupled with the clip 315 and a second end coupled with the weighted anchor 310. When the clip 315 is coupled to the decoy base 100 the loop 165 of the anchor coupling portion 160, the weighted anchor 310 is also coupled with the decoy base 100. The weighted anchor 310 is a dense or weighted object such that the weighted anchor 310 is configured to sink to or toward a bottom of a body of water. For example, when the anchor 300 is coupled with the decoy base 100, the weighted anchor 310 sinks to a bottom of the body of water and tethers the decoy base 100 to the bottom of the body of water via the rope 305 so that the decoy base 100 does not float away with regular movement of the water. Specifically, the anchor 300 allows the decoy base 100 to float only within a certain area (e.g., an area defined by a length of the rope 305 relative to a depth of the body of water) as constrained by the anchor 300. For example, the anchor 300 may keep the decoy base 100 to an area so that the decoy base 100 does not float outside of the area due to a water current or a wind force.

Referring to FIG. 14-19, an exemplary embodiment of the plug 1400 is depicted. The plug 1400 includes a first portion, shown as plug head 1415 and a second portion shown a plug body 1420. The plug head 1415 comprises the outer face 1405. The loop 165 extends outwardly from the outer face 1405, as noted above, the loop 165 is configured to facilitate coupling of the anchor 300 to the second portion 130 of the decoy base 100. In an exemplary embodiment, the plug body 1420 has a cross-sectional shape and dimension that corresponds to a cross-sectional shape and dimension of the cavity 700 of the keel 135 such that the plug body 1420 can be inserted snuggly into the cavity 700 of the keel 135. An interior face, shown as interior wall 1500 contacts the end 705 of the keel 135 with the plug body 1420 inserted into the cavity 700. The plug 1400 can be securely coupled with the keel 135 via an interference (e.g., press) fit, by an adhesive, by a fastener, or by some other means. For example, the adhesive can include glue, tape, paste, silicone, caulk, or some other adhesive material.

The plug body 1420 further comprises a plurality of recesses (e.g., grooves, cuts, channels) shown as grooves 1425. The grooves 1425 are defined along the plug body 1420 horizontally, creating a depressed region around an entirety or a portion of the plug body 1420. In embodiments where the plug 1400 is coupled with the keel 135 via an adhesive material, such as glue, silicone, caulk, or some other material, the adhesive material can be applied within the grooves 1425, where the grooves 1425 include a greater surface area than a smooth or groove-less plug body 1420, which can facilitate a greater degree of adherence of the adhesive material to the grooves 1425 and the plug body 1420 more generally. In other examples, some other sealing material can be positioned within at least one of the grooves 1425. For example, an O-ring or some other elastomeric (e.g., rubberized) material can be positioned within the groove 1425, where the O-ring can be depressed within the groove 1425 and between the plug 1400 and an inner surface of the cavity 700 to create a water proof seal between the plug 1400 and the keel 135. In various examples, the plug 1400 includes a cavity (e.g., recessed area), shown as plug cavity 1505. The plug cavity 1505 extends internally within the plug body 1420 and serves to increase a usable volume of the cavity 700 so that the cavity 700 can house a greater volume of weighted material, in one example.

The decoy base 100 includes the coupling member 103 to couple the first float member 102 with the second float member 102 and thereby form the body 101 of the decoy base 100. The first float member 102 and the second float member 102 are selectively coupled together by coupling member 103. For example, the coupling member 103 can be selectively removed by a user to separate the first float member 102 from the second float member 102. According to an exemplary embodiment, the coupling member 103 is an elastomeric band or strap that can be provided (e.g., installed, placed, positioned) at least partially around (e.g., over) at least a portion of the first float member 102 and a portion of the second float member 102. The elastomeric nature of the coupling member 103 can cause the coupling member 103 to apply a compressive force by to the first float member 102 and the second float member 102 to retain the first float member 102 against the second float member 102. In such examples, a user can apply a counteracting force to the first float member 102 and the second float member 102 to temporarily create a separation (e.g., space) between the first float member 102 and the second float member 102. When said counteracting force is removed, the coupling member 103 can again bring the first float member 102 against the second float member 102 by a compressive force.

According to an exemplary embodiment, the first float member 102 can be coupled with the second float member 102 with the second wall 120 of each float member 102 positioned against each other. Specifically, the second wall 120 of the first float member 102 can be positioned adjacent to or against the second wall 120 of the second float member 102. For example, the second wall 120 of the first float member 102 can be positioned directly adjacent to or directly against the second wall 120 of the second float member 102, or the second wall 120 of the first float member 102 can be positioned indirectly adjacent to or indirectly against the second wall 120 of the second float member 102 (e.g., with at least one intervening component). As described herein, the second wall 120 of the float member 102 is a substantially flat and substantially vertical wall. When the first float member 102 and the second float member 102 are coupled together, the second wall 120 of the first float member 102 can be substantially parallel with the second wall 120 of the second float member 102.

The slot 126 (e.g., the second mounting feature) of the decoy base 100 is formed as a substantially vertical slot 126 between the second wall 120 (e.g., the cooperating wall 120) of the first float member 102 and the second wall 120 (e.g., the cooperating wall 120) of the second float member 102 when the first float member 102 is coupled with the second float member 102. In embodiments where the first float member 102 and the second float member 102 are coupled together to form the body 101, the slot 126 of the decoy base 100 is formed between the second wall 120 of the first float member 102 and the second wall 120 of the second float member 102. Specifically, the second wall 120 (e.g., the cooperating wall 120) of the first float member 102 cooperates with the second wall 120 (e.g., the cooperating wall 120) of the second float member 102 to form the slot 126. The slot 126 is defined by the space between the second wall 120 of the first float member 102 and the second wall 120 of the second float member 102. Accordingly, when the second wall 120 of the first float member 102 is positioned close to or against the second wall 120 of the second float member 102, the slot 126 can have a width that is relatively small (e.g., less than 0.5 inches). When the second wall 120 of the first float member 102 is not positioned against the second wall 120 of the second float member 102, the slot 126 can have a width that is relatively large (e.g., greater than 0.5 inches). Beneficially, an object (e.g., a decoy or part thereof) positioned within the slot 126 can be retained within the slot 126 at least in part by a compressive force applied by the coupling member 103 or by a clamping force created by coupling the first float member 102 with the second float member 102. For example, in embodiments where the coupling member 103 is an elastomeric band or strap as discussed above, a decoy or some part thereof can be positioned within the slot 126 between the second wall 120 of the first float member 102 and the second wall 120 of the second float member 102, where the coupling member 103 can apply a compressive force to first float member 102 and the second float member 102, which can in turn apply a compressive or clamping force a decoy positioned within the slot 126. This compressive or clamping force is sufficient to retain the decoy within the slot 126 so that it is not inadvertently separated from the decoy base 100 during use (e.g., by a gust of wind or other force of nature). In other examples, the slot 126 or some additional slot is formed entirely on a single float member 102 such that the formation of the slot is not dependent upon the coupling of the first float member 102 with the second float member 102.

As noted above, each float member 102 includes at least one groove 125 positioned at (e.g., formed in or by) the second wall 120 of the respective float member 102. In embodiments, where the second wall 120 of the first float member 102 is positioned against or proximate to the second wall 120 of the second float member 102, a groove 125 of the first float member 102 can at least partially align with a groove 125 of the second float member 102 to collectively form the opening 145 of the decoy base 100. For example, the opening 145 of the decoy base 100 is formed as the space between a groove 125 of the second wall 120 of the first float member 102 and a groove 125 of the second wall 120 of the second float member 102. Because the second wall 120 of the first float member 102 and the second wall 120 of the second float member 102 can be substantially vertical walls, the grooves 125 of each of the first float member 102 and the second float member 102 can form the opening 145 as a substantially (e.g., ±15°) vertical opening 145. As noted above, the grooves 125 of the first float member 102 and the second float member 102 are formed on (e.g., formed along, defined by, positioned along) the respective second wall 120 of each float member 102.

When the second wall 120 of the first float member 102 is positioned close to or against the second wall 120 of the second float member 102, the opening 145 is formed and can have a width (e.g., diameter) that is relatively small (e.g., less than 0.5 inches). When the second wall 120 of the first float member 102 is not positioned against (e.g., is spaced apart from) the second wall 120 of the second float member 102, the opening 145 can have a width (e.g., diameter) that is relatively large (e.g., greater than 0.5 inches). Beneficially, an object (e.g., a decoy or part thereof) positioned within or received by the opening 145 can be retained within the opening 145 at least in part by a compressive force applied by the coupling member 103 or by a clamping force created by coupling the first float member 102 with the second float member 102. For example, in embodiments where the coupling member 103 is an elastomeric band or strap as discussed above, a decoy or some part thereof can be positioned within or received by the opening 145 between the second wall 120 of the first float member 102 and the second wall 120 of the second float member 102, where the coupling member 103 can apply a compressive force to first float member 102 and the second float member 102, which can in turn apply a compressive or clamping force a decoy positioned within or received by the opening 145. This compressive or clamping force is sufficient to retain the decoy within the opening 145 so that it is not inadvertently separated from the decoy base 100 during use (e.g., by a gust of wind or other force of nature).

In other examples, the coupling member 103 can be some other fastener or joining mechanism. For example, the coupling member 103 can be at least one fastener (e.g., bolt and nut, clip, screw, rivet, or some other fastener) that mechanically joins the first float member 102 with the second float member 102. In yet other examples, the coupling member 103 can be an adhesive applied between the second wall 120 (e.g., cooperating wall 120) of the first float member 102 and the second wall 120 (e.g., cooperating wall 120) of the second float member 102 to join the second wall 120 of the first float member 102 with the second wall 120 of the second float member 102. In yet other examples, the coupling member 103 can be a hinged mechanism that secures the first float member 102 with the second float member 102 in a movable or pivotable fashion. For example, the coupling member 103 can be a spring-loaded hinge that allows the first float member 102 to pivot relative to the second float member 102 increase a distance between an upper portion of the second wall 120 of the first float member 102 relative to an upper portion of the second wall 120 of the second float member 102 while also decreasing a distance between a lower portion of the second wall 120 of the first float member 102 relative to a lower portion of the second wall 120 of the second float member 102. In such an arrangement, the slot 126 of the decoy base 100 can be selectively expanded so that a user can insert a decoy or a portion thereof into the slot 126. Upon releasing the spring-loaded hinge, the slot 126 can contract, and the second wall 120 of the first float member 102 and the second wall 120 of the second float member 102 can clamp a portion of the decoy within the slot 126 (e.g., by a biasing spring force generated by the spring-loaded hinge). In yet other examples, the coupling member 103 could be other type of coupling member 103 that can selectively couple the first float member 102 with the second float member 102 and/or selectively couple or retain a decoy to the decoy base 100.

In other embodiments, the decoy base 100 includes multiple mounting features, such as the slot 126, the opening 145, or other mounting features to couple a decoy to the decoy base 100. As discussed above, in the embodiment depicted in FIGS. 1-13 and 21-26, the slot 126 and the opening 145 are formed at least in part by the coupling of the first float member 102 with the second float member 102. For example, the slot 126 or the opening 145 can be defined by the second wall 120 of the first float member 102 and the second wall 120 of the second float member 102. Specifically, the positioning of the second wall 120 of the first float member 102 against or proximate to the second wall 120 of the second float member 102 can at least partially form the slot 126 or the opening 145. However, it is understood that the decoy base 100 can include other or additional mounting features, such as slots or openings, that are not formed by the second wall 120 of the first float member 102 and the second wall 120 of the second float member 102. For example, each individual float member 102 could include at least one slot, at least one opening, or at least one additional mounting feature (e.g., a peg, a threaded hole, a clamp, a clip, etc.) that can exist independent or irrespective of any interaction between the respective float member 102 and an additional float member 102. Put another way, the decoy base 100 can include mounting features that do not require coupling of one float member 102 with another float member 102 to form the mounting feature.

In other embodiments, the decoy base 100 need not include by two or more separate float members. For example, the body 101 can be a single unitary body 101 rather than a body 101 formed by the coupling of the first float member 102 with the second float member 102. In such embodiments, the decoy base 100 can be configured to float on a body of water with a first portion (e.g., a float portion) positioned substantially atop a water surface and a second portion (e.g., a keel portion) extending vertically beneath the first portion and at least partially underneath a water surface. The first portion can include at least one mounting feature, such as at least one opening 145 or at least one slot 126, each of which can be configured to receive at least a portion of a decoy to mount the decoy to the decoy base 100.

As noted above, the decoy base 100 is configured to support at least one decoy and to float on a body of water. The decoy or decoys supported by the decoy base 100 can be land decoys (e.g., land-based decoys) that do not float on a body of water on their own. That is, the decoys that are supported by the decoy base 100 are decoys that are not self-equipped with a floating device or mechanism to permit the decoy to be used on a body of water. Instead, the decoy is configured for use on land. So, using these same decoys on water requires the decoy base 100 that both supports (e.g., couples with) the land decoy and floats on the body of water while supporting the land decoy.

Figure 20:
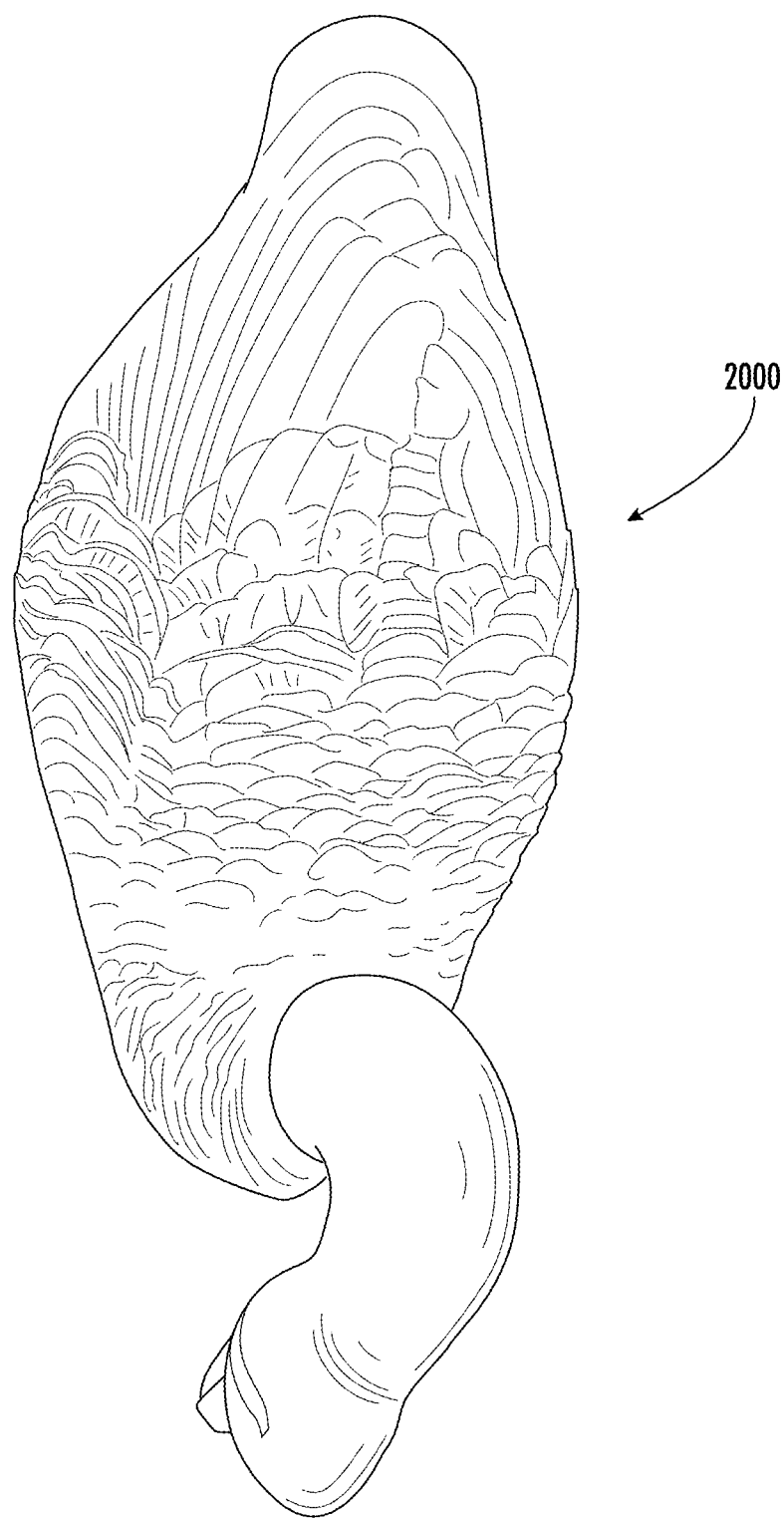
FIG. 20 is a top perspective view of a shell decoy, according to an embodiment.
Figure 21:
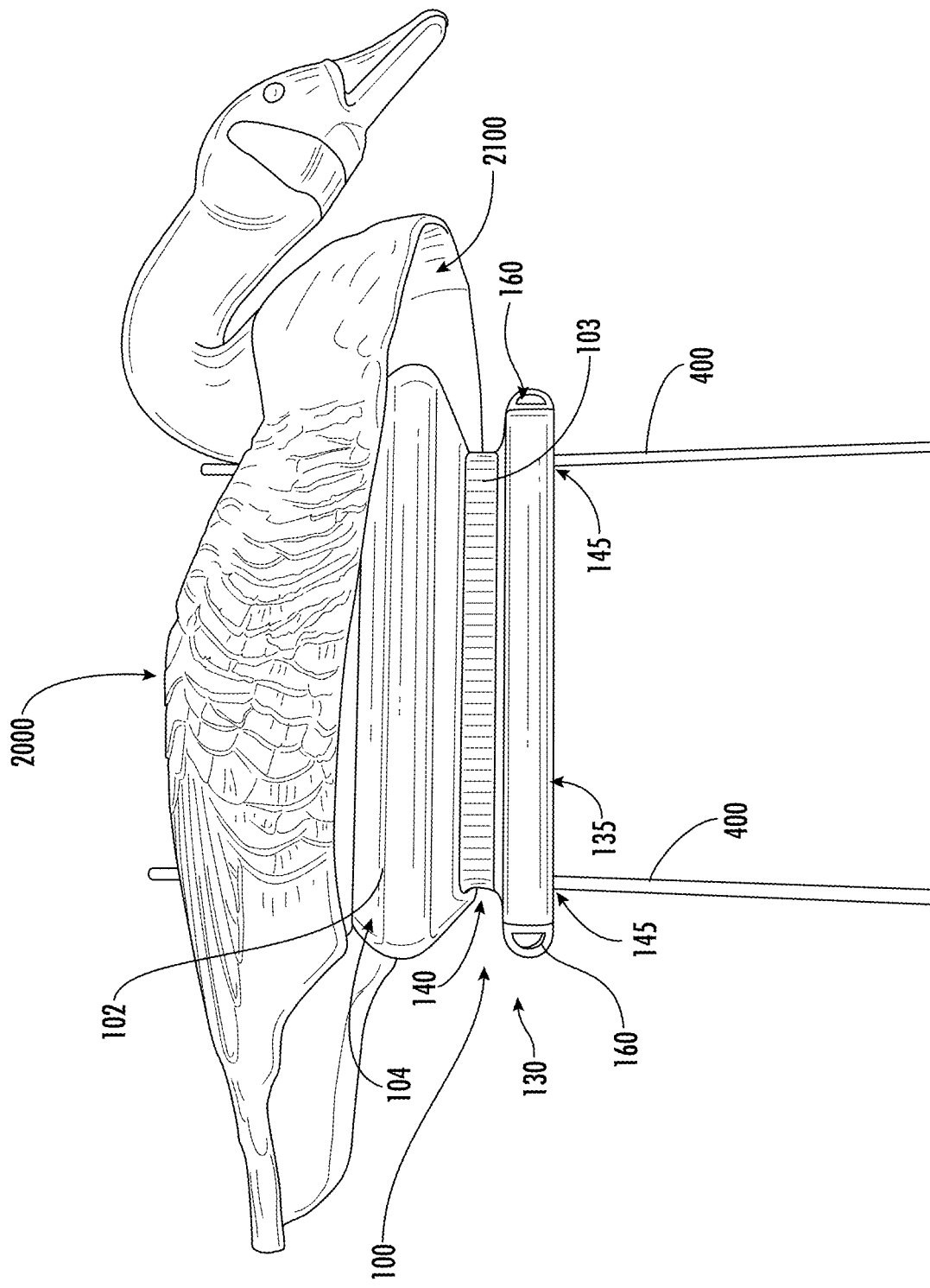
FIG. 21 is a perspective view of a shell decoy coupled with a floating decoy base, according to an embodiment.
Figure 22:
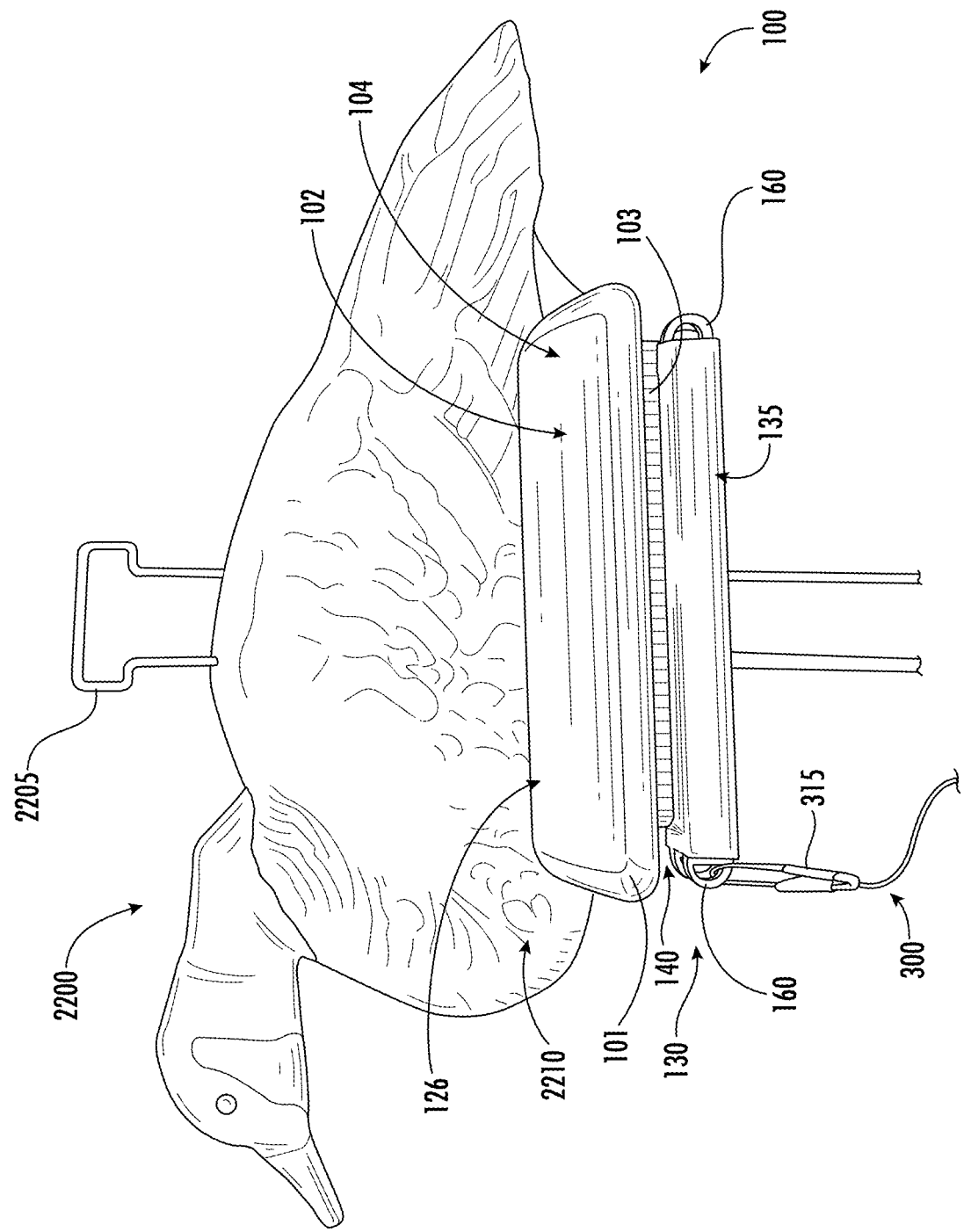
FIG. 22 is a perspective view of a silhouette decoy coupled with a floating decoy base, according to an embodiment.
Figure 23:
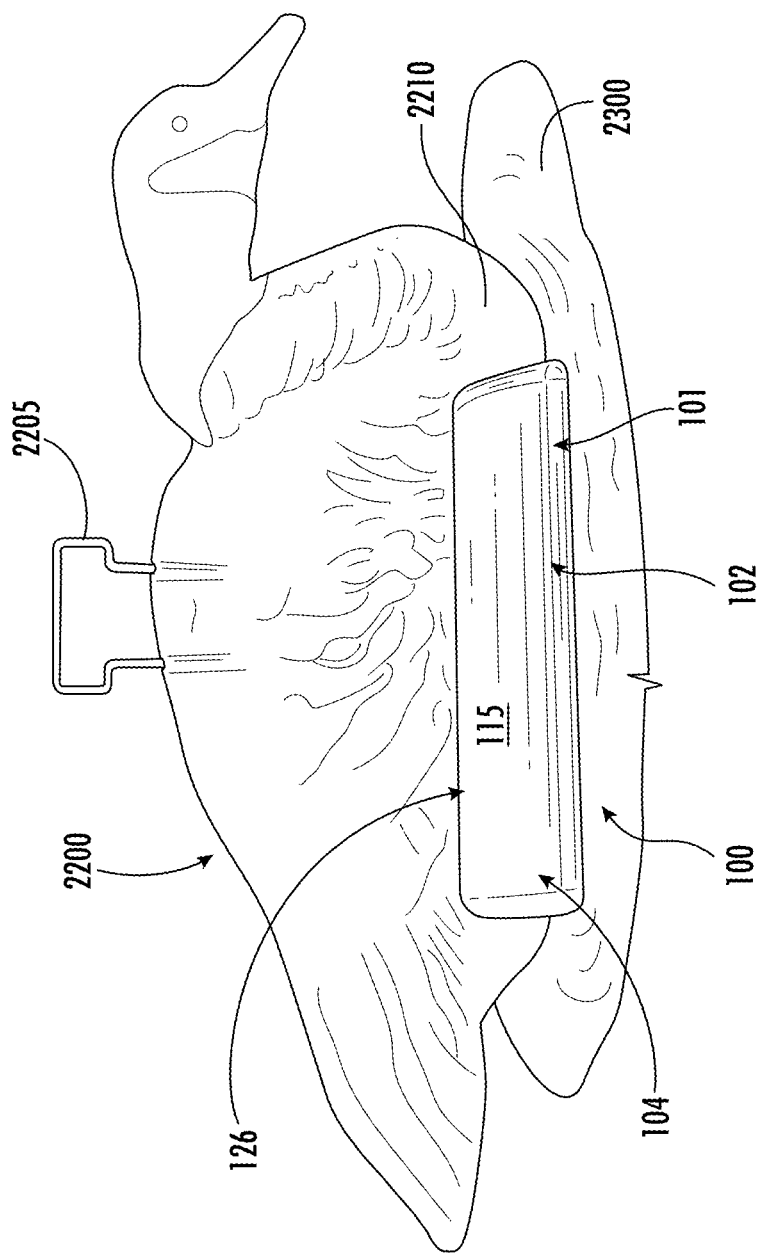
FIG. 23 is perspective view of a silhouette decoy coupled with a floating decoy base and floating on a body of water, according to an example embodiment.
Figure 24:
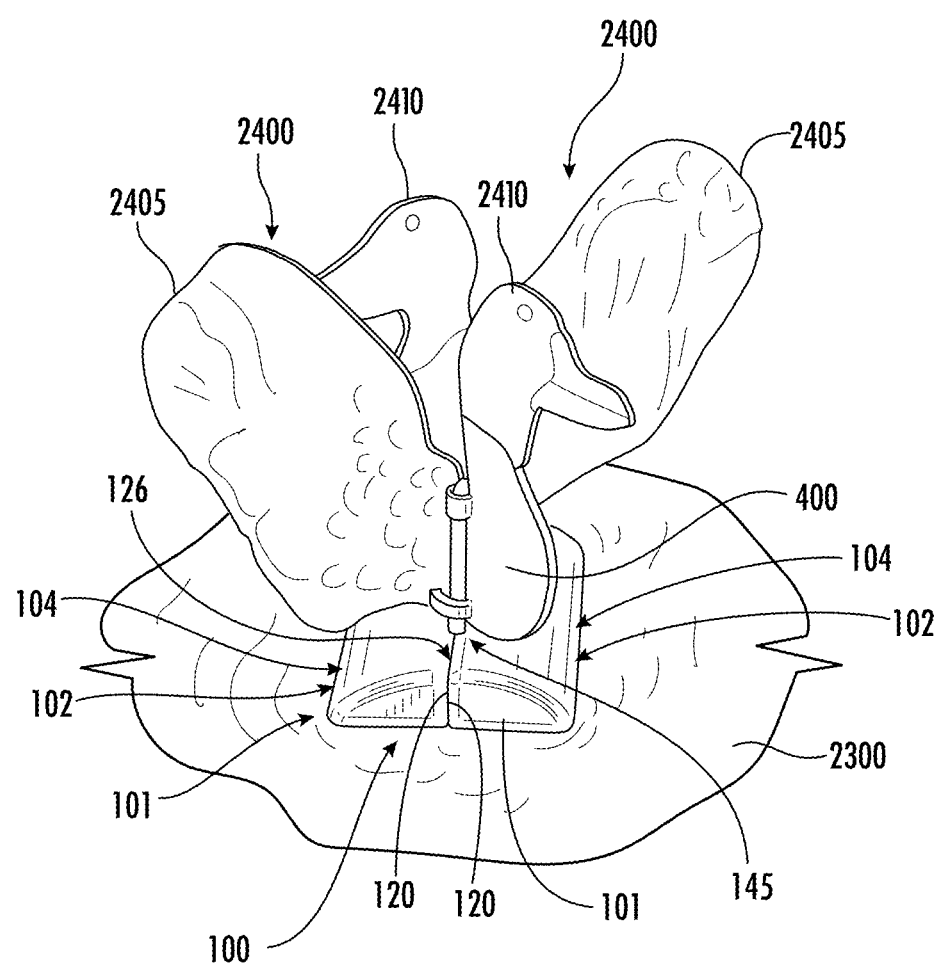
FIG. 24 is perspective view of two sock decoys coupled with a floating decoy base and floating on a body of water, according to an example embodiment.
Figure 25:
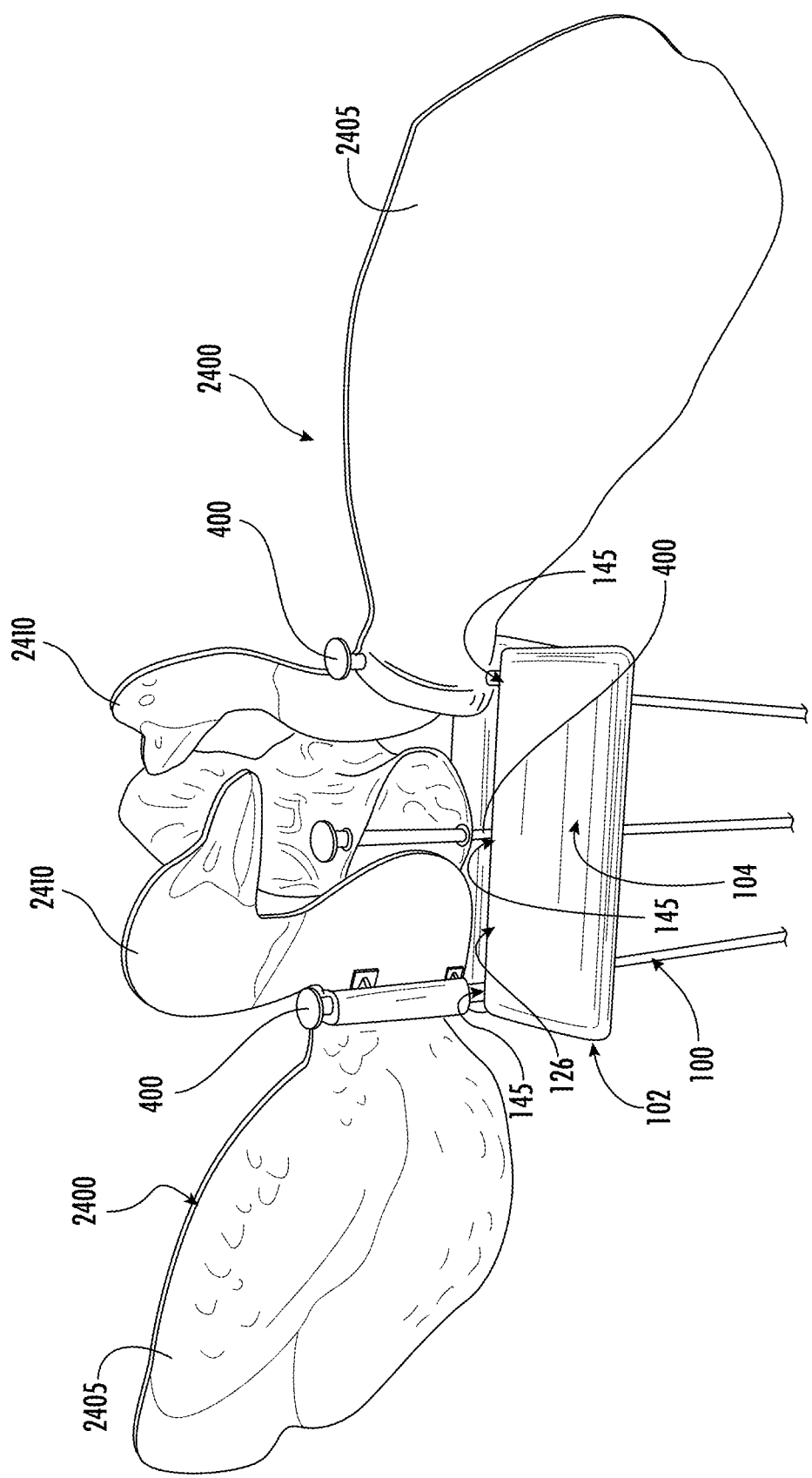
FIG. 25 is perspective view of three sock decoys coupled with a floating decoy base, according to an example embodiment.
Figure 26:
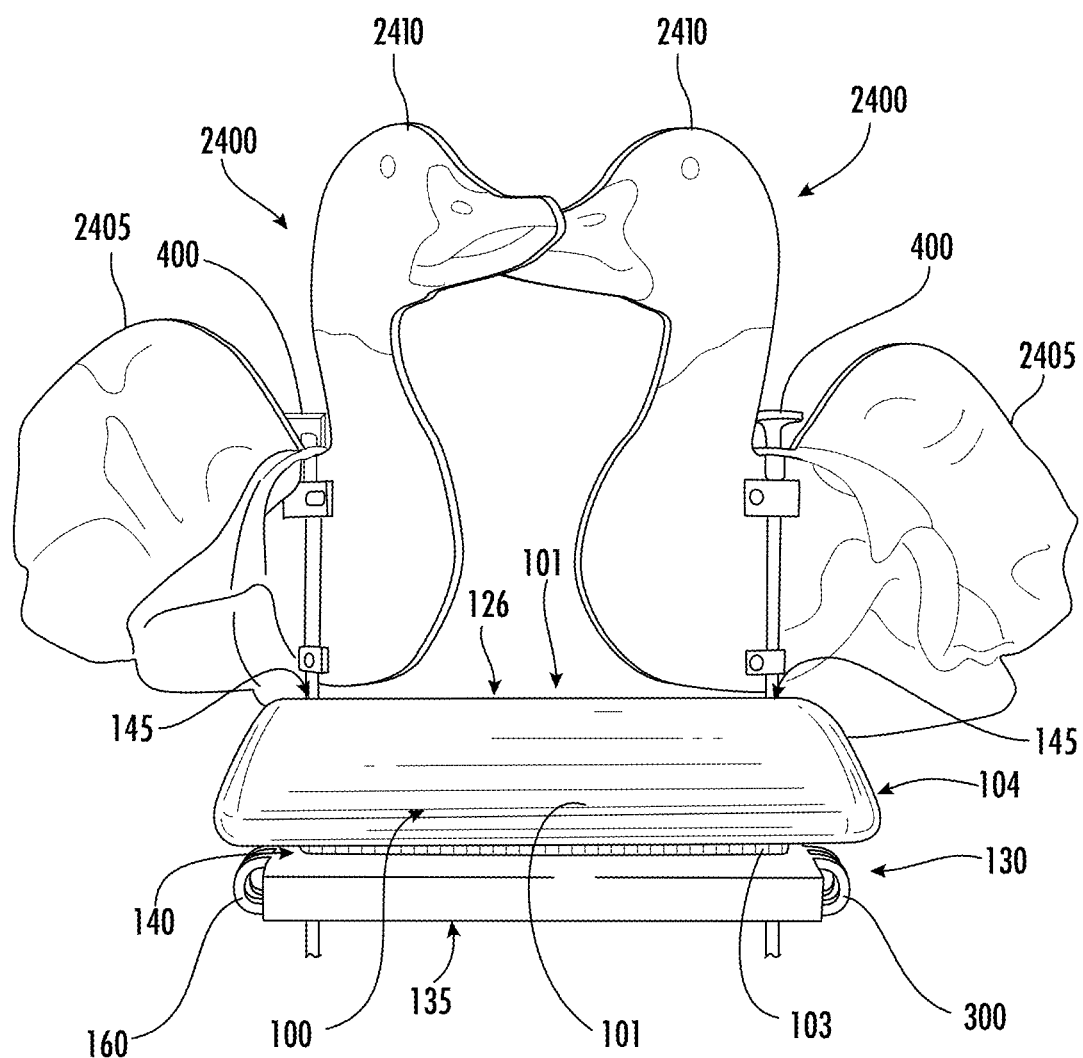
FIG. 26 is perspective view of two sock decoys coupled with a floating decoy base, according to an example embodiment.

As depicted in FIGS. 20-26, among others, a variety of decoys can be supported by the decoy base 100. For example, as shown in FIGS. 20 and 21, the decoy can be a shell decoy 2000. As shown in FIGS. 22 and 23, among others, the decoy can be a silhouette decoy 2200. As shown in FIGS. 24-26, among others, the decoy can be a sock decoy 2400. Each of the shell decoy 2000, the silhouette decoy 2200, and the sock decoy 2400 can be supported by the decoy base 100 so that each can be used on a body of water, rather than being limited only to use on land. For example, each of the shell decoy 2000, silhouette decoy 2200, or sock decoy 2400 can engage with at least one mounting feature of the decoy base 100, such as the opening 145 in the case of the shell decoy 2000 and the sock decoy 2400, or the slot 126 in the case of the silhouette decoy 2200, for example. It is understood that the decoy base 100 can support other decoys beyond the aforementioned shell decoy 2000, silhouette decoy 2200, or sock decoy 2400, and that the discussion herein pertaining to the shell decoy 2000, silhouette decoy 2200, or sock decoy 2400 is not intended to be limiting.

FIGS. 20 and 21 depict the shell decoy 2000. The shell decoy 2000 can be a decoy of a duck or some other animal (e.g., water fowl, goose, pheasant, or some other animal). The shell decoy 2000 includes an outer shell defining an interior 2100. The shell decoy 2000 can be positioned above the decoy base 100 such that the decoy base 100 extends at least partially into the interior 2100 of the shell decoy 2000 when the shell decoy 2000 is coupled with the decoy base 100, as is depicted in FIG. 21. The shell decoy 2000 coupled to the decoy base 100 via engagement between at least one rod 400 and at least one mounting feature of the decoy base 100. Specifically, the shell decoy 2000 includes at least one rod 400 extending at least partially through the interior 2100 of the shell decoy 2000, where the rod 400 is configured to be received by (e.g., positioned at least partially within) an opening 145 of the decoy base 100. For example, the rod 400 includes a diameter, cross-sectional shape, or other dimension that corresponds to a diameter, cross-sectional shape, or other dimension of the opening 145 such that the rod 400 can be coupled to the decoy base 100 via the opening 145. In an exemplary embodiment, the shell decoy 2000 includes multiple rods 400, such as a first rod 400 and a second rod 400, where each rod 400 is coupled with (e.g., received in, engaged with) a respective opening 145 of the decoy base 100. In the example embodiment shown in FIG. 21, a first rod 400 and a second rod 400 are retained (e.g., secured) within the opening 145 at least in part by a force imparted by the coupling member 103 on the first float member 102 and the second float member 102, which further creates a compressive force to be applied to the rod 400 that extends in the opening 145 between the second wall 120 of the first float member 102 and the second wall 120 of the second float member 102.

In various examples, the rod 400 can be movably engaged with the shell decoy 2000 so that the position of the shell decoy 2000 along a length of the rod 400 can be altered. For example, the shell decoy 2000 can include the rod 400 slidably engaged with and selectively couplable (e.g., via a nut and washer, via a retainer clip, via some other coupling mechanism) with the outer shell of the shell decoy 2000 via a hole in the outer shell. The hole can allow the rods 400 to slide up through the shell decoy 2000. In other embodiments, the rod 400 can include a flange or other radially extending portion upon which the inner surface of the outer shell can rest. In yet other embodiments, the rod 400 can be affixed to the shell decoy 2000 by an adhesive medium (e.g., caulk, silicone, glue, or some other adhesive).

FIGS. 22 and 23 depicts the silhouette decoy 2200 coupled to the decoy base 100. The silhouette decoy 2200 can be a duck decoy or some other decoy (e.g., a goose decoy, a peasant decoy, or some other decoy). The silhouette decoy 2200 is a substantially planar or two-dimensional decoy. For example, the silhouette decoy 2200 can depict the silhouette of an animal when viewed from a front side or a back side, but can appear as a thin board or plank when viewed from a left side or a right side (e.g., a side perpendicular to the front or back side). Because the silhouette decoy 2200 (or at least a portion thereof) is structured as a relatively thin board or plank, the silhouette decoy 2200 includes a lower portion 2210 that is a slender portion having a length that is substantially greater (e.g., ten times greater) than a width or thickness. When used on land, the silhouette decoy 2200 can be secured to a ground surface via at least one stake 2205. The stake 2205 can extend through the silhouette decoy 2200 and extend from the lower portion 2210 of the silhouette decoy 2200.

The silhouette decoy 2200 is configured to couple with the decoy base 100 via the slot 126. Specifically, the lower portion 2210 of the silhouette decoy 2200 can be positioned within the slot 126 of the decoy base 100 to couple the silhouette decoy 2200 with the decoy base 100. As discussed above, the slot 126 is formed between the second wall 120 of the first float member 102 and the second wall 120 of the second float member 102, according to an exemplary embodiment. In such embodiments, the coupling member 103 is configured to apply a force to the first float member 102 and the second float member 102 to couple the first float member 102 with the second float member 102. The force applied by the coupling member 103 can in turn cause the first float member 102 and the second float member 102 to apply a compressive force to a silhouette decoy 2200 that is positioned at least partially within the slot 126. Specifically, the lower portion 2210 of the silhouette decoy 2200 can be compressed or squeezed between the second wall 120 of the first float member 102 and the second wall 120 of the second float member 102 to couple the silhouette decoy 2200 to the decoy base 100. The compressive force is sufficient to retain the silhouette decoy 2200 within the slot 126 during use of the decoy base 100. When the silhouette decoy 2200 is coupled with the decoy base 100, the stake 2205 of the silhouette decoy can extend between the second wall 120 of the first float member 102 and the second wall 120 of the second float member 102 and vertically below the decoy base 100 (e.g., vertically below the keel 135). In other embodiments, the lower portion 2210 of the silhouette decoy 2200 can slightly deform to fit within a rigid slot 126 via an interference fit, as may be the case if the body 101 of the decoy base 100 is a unitary member not formed by two or more separate float members 102 or if the slot 126 is positioned on the body 101 in a location other than between the second wall 120 of the first float member 102 and the second wall 120 of the second float member 102.

As depicted in FIG. 23, the decoy base 100 is configured to support the silhouette decoy 2200 with the decoy base 100 floating on a body of water. In such an arrangement, the silhouette decoy 2200 can be positioned substantially above a surface 2300 of the water, while at least a portion of the decoy base 100 (e.g., the second portion 130) is positioned below the surface 2300 of the water. In such examples, the stake 2205 of the silhouette decoy 2200 can extend at least partially beneath the surface 2300 of the water.

FIGS. 24-26, among others, depict at least one sock decoy 2400 coupled with the decoy base 100. Each sock decoy 2400 can include a rod 400, a sock portion 2405, and a rigid portion 2410. The rod 400 is positioned between the rigid portion 2410 and the sock portion 2405. The rigid portion 2410 can be a rigid or semi-rigid portion of the sock decoy 2400 that depicts a face or front portion of an animal, such as a water fowl, a duck, a pheasant, or some other animal. The sock portion 2405 is a flexible or semi-flexible portion of the sock decoy 2400 that depicts a rear, wing, or tail portion of the animal. The sock portion 2405 is configured to move (e.g., wave) with a gust of wind, for example, to simulate movement of a real animal. The sock decoys 2400 include the rods 400, which, in a land application are staked or driven into a ground surface. The sock decoy 2400 is pivotally coupled with the rod 400 so that the rigid portion 2410 and the sock portion 2405 is capable of pivoting relative about the rod 400 (e.g., about an axis extending through the rod 400). Accordingly, movement of the sock portion 2405 can translate into rotational or pivotal movement of the sock decoy 2400 about the rod 400.

The sock decoy 2400 is configured to couple to the decoy base 100 via engagement between at least one rod 400 and at least one mounting feature of the decoy base 100. Specifically, the rod 400 of the sock decoy 2400 is configured to be received by (e.g., positioned at least partially within) an opening 145 of the decoy base 100. For example, the rod 400 includes a diameter, cross-sectional shape, or other dimension that corresponds to a diameter, cross-sectional shape, or other dimension of the opening 145 such that the rod 400 can be coupled to the decoy base 100 via the opening 145. In an exemplary embodiment, the sock decoy 2400 includes a single rod 400. In embodiments where the decoy base 100 includes multiple openings 145, multiple sock decoys 2400 can be coupled with the decoy base 100, with each sock decoy 2400 including a rod 400 that is received in an opening 145 of the decoy base 100, as depicted in FIGS. 24-26. The rod 400 of the sock decoy 2400 is retained (e.g., secured) within the opening 145 at least in part by a force imparted by the coupling member 103 on the first float member 102 and the second float member 102, which further creates a compressive force to be applied to the rod 400 that extends in the opening 145 between the second wall 120 of the first float member 102 and the second wall 120 of the second float member 102.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the floating decoy base as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A floating decoy base for a land decoy, comprising:
   a buoyant first float member including a cooperating wall, a keel coupled to the cooperating wall, and a mounting feature;
   a buoyant second float member including a cooperating wall, a keel coupled to the cooperating wall, and a mounting feature; and
   a coupling member engaged with the first float member and second float member to selectively couple the first float member to the second float member with the cooperating wall of the first float member adjacent the cooperating wall of the second float member,
   wherein, with the floating decoy base positioned in a body of water, the mounting feature of the first float member and the mounting feature of the second float member are positioned at least partially above a surface of the body of water, and the keel of the first float member and the keel of the second float member are positioned below the surface of the body of water, and
   wherein at least one mounting feature of the first and second float members is configured to engage with at least a portion of a land decoy to couple a land decoy to the floating decoy base.

2. The floating decoy base of claim 1, wherein the cooperating wall of the first float member and the cooperating wall of the second float member extend substantially vertically.

3. The floating decoy base of claim 1, further comprising:
   the mounting feature of the first float member including a first groove; and
   the mounting feature of the second float member including a second groove,
   wherein, when the first float member is coupled with the second float member, the first groove and the second groove are at least partially aligned to form an opening, the opening configured to engage with a portion of a land decoy.

4. The floating decoy base of claim 3, further comprising:
   the first groove extending vertically along the second wall of the first float member; and
   the second groove extending vertically along the second wall of the second float member,
   wherein the portion of the land decoy is a rod configured to stake a land decoy to a ground surface when used on land.

5. The floating decoy base of claim 1, wherein the cooperating wall of the first float member and the cooperating wall of the second float member define a slot, the slot configured to receive at least a portion of a substantially two-dimensional land decoy.

6. The floating decoy base of claim 1, further comprising:
   the coupling member comprising an elastomeric band, the elastomeric band configured to apply a force to the first float member and the second float member to couple the first float member to the second float member.

7. The floating decoy base of claim 1, further comprising:
   the coupling member comprising an elastomeric band, the elastomeric band configured to apply a force to the first float member and the second float member to couple the first float member to the second float member,
   wherein the cooperating wall of the first float member and the cooperating wall of the second float member define a slot, the slot configured to receive at least a portion of a second land decoy.

8. The floating decoy base of claim 1, further comprising:
the first float member including a waist coupled with the keel of the first float member, the second float member including a waist coupled with the keel of the second float member;
the coupling member comprising an elastomeric band, the elastomeric band configured to apply a force to the waist of the first float member and the waist of the second float member to couple the first float member to the second float member,
wherein the cooperating wall of the first float member and the cooperating wall of the second float member define a slot, the slot configured to receive at least a portion of a land decoy,
wherein the coupling member is configured to apply a compressive force to the portion of a land decoy within the slot via the cooperating wall of the first float member and the cooperating wall of the second float member.

9. The floating decoy base of claim 1, further comprising:
a loop extending from the keel of the first float member, the loop configured to couple an anchor to the keel of the first float member.

10. The floating decoy base of claim 1, further comprising:
the keel of the first float member defining a cavity;
an amount of weighted material positioned within the cavity; and
a plug removably coupled with an end of the keel of the first float member to encapsulate the weighted material within the cavity.

11. The floating decoy base of claim 10, wherein the plug includes a loop extending from an outer face of the plug, the loop configured to couple an anchor to the plug.

12. A floating decoy base for a land decoy, comprising:
a buoyant first float member including a first portion coupled with a second portion, the first portion defining a first wall and a cooperating wall substantially perpendicular to the first wall, the second portion including a waist coupled to the cooperating wall;
a buoyant second float member including a first portion coupled with a second portion, the first portion defining a first wall and a cooperating wall substantially perpendicular to the first wall, the second portion including a waist coupled to the cooperating wall;
a coupling member positioned at least partially around the waist of the first float member and the waist of the second float member to selectively couple the first float member to the second float member with the cooperating wall of the first float member adjacent to the cooperating wall of the second float member; and
wherein, with the floating decoy base positioned in a body of water, the first portion of the first float member and the first portion of the second float member are positioned at least partially above a surface of the body of water, and second portion of first float member and the second portion of the second float member are positioned below the surface of the body of water, and
wherein the coupling member is configured to apply a compressive force to a portion of a land decoy positioned between the cooperating wall of the first float member and the cooperating wall of the second float member to couple a land decoy to the first float member and the second float member.

13. The floating decoy base of claim 12, further comprising:
the cooperating wall of the float member defining a first groove; and
the cooperating wall of the second float member defining a second groove,
wherein, with the first float member is coupled with the second float member, the first groove and the second groove are at least partially aligned to form an opening, the opening configured to engage with a portion of a land decoy.

14. The floating decoy base of claim 13, further comprising:
the first groove extending substantially vertically along the cooperating wall of the first float member; and
the second groove extending substantially vertically along the cooperating wall of the second float member,
wherein the opening is configured to receive a rod that is configured to stake a land decoy to a ground surface.

15. The floating decoy base of claim 12, further comprising:
a loop extending from the second portion of the first float member, the loop configured to couple an anchor to the second portion.

16. The floating decoy base of claim 12, further comprising:
the second portion of the first float member including a keel coupled with the waist, the keel defining a cavity;
an amount of weighted material positioned within the cavity; and
a plug removably coupled with an end of the keel to encapsulate the weighted material within the cavity.

17. A floating decoy base for a land decoy, comprising:
a bottom wall configured to contact a surface of a body of water with the floating decoy base in an operating position;
an outer wall coupled with the bottom wall, the outer wall defining an opening and a slot and configured to be positioned above the surface of the water in the operating position;
a keel coupled with the bottom wall and configured to be positioned beneath the surface of the body of water in the operating position; and
at least one loop coupled with the keel;
wherein the opening is configured to receive a rod of a first land decoy to selectively couple a first land decoy with the outer wall; and
wherein the slot is configured to receive a portion of a second land decoy to selectively couple a second land decoy with the outer wall.

18. The floating decoy base of claim 17, further comprising:
the keel defining a cavity;
an amount of weighted material removably positioned within the cavity; and
a plug removably coupled with an end of the keel to encapsulate the weighted material within the cavity.

19. The floating decoy base of claim 17, further comprising:
the opening extending through the floating decoy base, wherein a rod of a first land decoy is configured to extend beyond the keel.

20. The floating decoy base of claim 17, wherein the first land decoy is a one of a sock decoy or a shell decoy, wherein the second land decoy is a silhouette decoy.

* * * * *